(12) United States Patent
Liu et al.

(10) Patent No.: US 12,519,385 B2
(45) Date of Patent: Jan. 6, 2026

(54) BIAS POWER SUPPLY APPARATUS AND CONTROL METHOD

(71) Applicant: Halo Microelectronics International, Campbell, CA (US)

(72) Inventors: Rui Liu, Fremont, CA (US); Sofjan Goenawan, Cupertino, CA (US)

(73) Assignee: Halo Microelectronics International, Campbell, CA (US)

( * ) Notice: Subject to any disclaimer, the term of this patent is extended or adjusted under 35 U.S.C. 154(b) by 223 days.

(21) Appl. No.: 18/241,363

(22) Filed: Sep. 1, 2023

(65) Prior Publication Data
US 2025/0079969 A1 Mar. 6, 2025

(51) Int. Cl.
*H02M 1/00* (2007.01)
*H02M 1/36* (2007.01)
*H02M 3/07* (2006.01)
*H02M 3/158* (2006.01)

(52) U.S. Cl.
CPC ......... *H02M 1/0095* (2021.05); *H02M 1/009* (2021.05); *H02M 1/36* (2013.01); *H02M 3/07* (2013.01); *H02M 3/158* (2013.01); *H02M 1/0045* (2021.05)

(58) Field of Classification Search
CPC .... H02M 1/0035; H02M 1/0095; H02M 1/36; H02M 3/07; H02M 3/158; H02M 1/0045; H02M 1/009
See application file for complete search history.

(56) References Cited

U.S. PATENT DOCUMENTS

2008/0239772 A1* 10/2008 Oraw .................. H02M 7/4837
363/60

* cited by examiner

*Primary Examiner* — Jue Zhang
(74) *Attorney, Agent, or Firm* — AP3 Law Firm PLLC

(57) ABSTRACT

An apparatus includes a first switch connected between an input voltage bus of a hybrid switched capacitor converter and an input of a bias power regulator, a second switch connected between a first switching node of the hybrid switched capacitor converter and the input of the bias power regulator, wherein the second switch is configured such that when the second switch is turned on, a voltage on the first switching node is equal to (N/M) of a voltage on the input voltage bus, a third switch connected between a second switching node of the hybrid switched capacitor converter and the input of the bias power regulator, wherein the third switch is configured such that when the third switch is turned on, a voltage on the second switching node is equal to (L/M) of the voltage on the input voltage bus.

20 Claims, 14 Drawing Sheets

BIAS POWER SUPPLY APPARATUS AND CONTROL METHOD

TECHNICAL FIELD

The present invention relates to a bias power supply apparatus and control method, and, in particular embodiments, to a bias power supply apparatus and control method for efficiently operating a hybrid switched capacitor power converter.

BACKGROUND

Data centers often employ a power conversion system having a 12-V voltage bus. The 12-V bus voltage is generated from an ac/dc power supply. Alternatively, the 12-V bus voltage is converted from a 48-V voltage bus. The 12-V bus is further converted into low voltages, such as 0.7V, 1.0V, 1.2V, 1.5V, 1.8V and the like to power up different system loads including central processing units (CPUs), graphics processing units (GPUs), application-specific integrated circuits (ASICs), field-programmable gate arrays (FPGAs), communication input/output (I/O) bus voltages and the like.

As the power level has been increasing dramatically in recent developments of fast/large scale processors, the power losses in the power supplies that power up these system loads also increase dramatically. Additional heat management devices are required to remove the heat generated by the additional power losses from these power supplies, resulting in product cost increases.

Hybrid power converters have drawn much attention recently to replace the commonly used buck converters in the applications where a sub 1V output voltage is generated from a 12-V bus voltage. FIG. 1 shows a hybrid converter with a single flying capacitor. The power conversion system 100 shown in FIG. 1 comprises one input filtering capacitor 101, four switches S101, S102, S103, S104, one flying capacitor 106, two output inductors 107, 108, and one output filtering capacitor 109. The power conversion system 100 further comprises one low-dropout (LDO) regulator 113 and one LDO output capacitor 114.

FIG. 2 illustrates various waveforms associated with the hybrid converter shown in FIG. 1. In one switching period (Ts), there are four time intervals. A first time interval T1 is from t0 to t1. A second time interval T2 is from t1 to Ts/2. A third time interval T3 is from Ts/2 to t3. A fourth time interval T4 is from t3 to Ts. In steady state operation, T1 is equal to T3. T2 is equal to T4. The duty cycle of the hybrid converter is denoted as D. D is equal to T1/Ts or T3/Ts.

In the T1 interval, switches S101 and S104 are turned on. Power is delivered from the input Vin to the output capacitor 109 through the power switch S101, the flying capacitor 106 and the inductor 108. The flying capacitor 106 and the output inductor 108 are charged. In the T1 interval, energy stored in the inductor 107 is discharged to the output capacitor 109 through the switch S104. The voltage on the switching node 110 is equal to Vin minus the voltage V106 across the flying capacitor 106. The voltage on the switching node 111 is equal to zero.

In the T2 interval, switches S103 and S104 are turned on, and switches S101 and S102 are turned off. Energy stored in the output inductors 107 and 108 are discharged to the output capacitor 109. No power is transferred from the input Vin to the output capacitor 109 in this interval.

In the T3 interval, switches S102 and S103 are turned on, and switches S101 and S104 are turned off. Energy stored in the flying capacitor 106 is discharged to the output capacitor 109 through the switch S103, the switch S102 and the output inductor 107. The output inductor 107 is charged. The energy stored in the output inductor 108 is discharged to the output capacitor 109 through the switch S103. Voltages on switching nodes 112 and 111 are equal to V106. The voltage on the switching node 110 is equal to zero. No power is transferred from the input Vin to the output.

In the T4 interval, switches S103 and S104 are turned on, and switches S101 and S102 are turned off. Energy stored in the output inductors 107 and 108 are discharged to the output capacitor 109. No power is transferred from the input Vin to the output capacitor 109 in this interval.

According to the description above, the average voltages on switching nodes 110 and 111 over one switching cycle are given in the following equations:

$$V110\_AVG = T1 \times (Vin - V106)/Ts \qquad (1)$$

$$V111\_AVG = T3 \times V106/Ts \qquad (2)$$

In Equation (1), V110_AVG is the average voltage on the switching node 110. In Equation (2), V111_AVG is the average voltage on the switching node 111. In steady state operation, the average voltages of switching nodes 110 and 111 must be equal, otherwise, the voltage difference between V110_AVG and V111_AVG generates a dc current flowing through the output inductors 107 and 108. This dc current discharges or charges the flying capacitor 106 until V110_AVG is equal to V111_AVG. Once V110_AVG is equal to V111_AVG, the following equation holds:

$$T1 \times (Vin - V106 = T3 \times V106 \qquad (3)$$

Since T1 is equal to T3, the following equation can be obtained:

$$V106 = Vin/2 \qquad (4)$$

When the power conversion system 100 is integrated into a monolithic IC, a bias supply (e.g., a 5-V bias power supply) is needed to power up the internal control and driver circuitry to operate the power conversion system 100 properly. A simple way is to use a LDO to generate the 5-V bias supply from the input Vin as shown in FIG. 1. This bias power supply may cause a significant power loss. For example, Vin is equal to 12 V. The output voltage of the bias LDO is 5 V. The current flowing through the LDO is about 50 mA. If Vin is directly applied to the input of the LDO, the power loss is about 350 milliwatts. This power loss prevents the power conversion system 100 from achieving high efficiency. It would be desirable to have an efficient bias power supply apparatus to reduce the losses in the LDO. The present disclosure addresses this need.

SUMMARY

These and other problems are generally solved or circumvented, and technical advantages are generally achieved, by preferred embodiments of the present disclosure which provide a bias power supply apparatus and control method for efficiently operating a hybrid switched capacitor power converter.

In accordance with an embodiment, an apparatus comprises a first switch connected between an input voltage bus of a hybrid switched capacitor converter and an input of a bias power regulator, a second switch connected between a first switching node of the hybrid switched capacitor converter and the input of the bias power regulator, wherein the second switch is configured such that when the second switch is turned on, a voltage on the first switching node is equal to (N/M) of a voltage on the input voltage bus, and a third switch connected between a second switching node of the hybrid switched capacitor converter and the input of the bias power regulator, wherein the third switch is configured such that when the third switch is turned on, a voltage on the second switching node is equal to (L/M) of the voltage on the input voltage bus, and wherein L, M and N are positive integers, N is less than M, and L is less than M.

In accordance with another embodiment, a method comprises in a startup process of a hybrid switched capacitor converter, configuring an input of a bias power regulator to be connected to an input voltage bus of the hybrid switched capacitor converter through a first switch, and after the startup process of the hybrid switched capacitor converter finishes, configuring the input of the bias power regulator to be connected to a first switching node and/or a second switching node of the hybrid switched capacitor converter through a second switch and/or a third switch, respectively, wherein the second switch and the third switch are configured such that a voltage on the input of the bias power regulator is equal to (L/M) of a voltage on the input voltage bus, and wherein L and M are positive integers, and M is greater than L.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a bias power supply apparatus and control method for efficiently operating a hybrid switched capacitor power converter. The disclosure may also be applied, however, to a variety of power converters. Hereinafter, various embodiments will be explained in detail with reference to the accompanying drawings.

Figure 1:
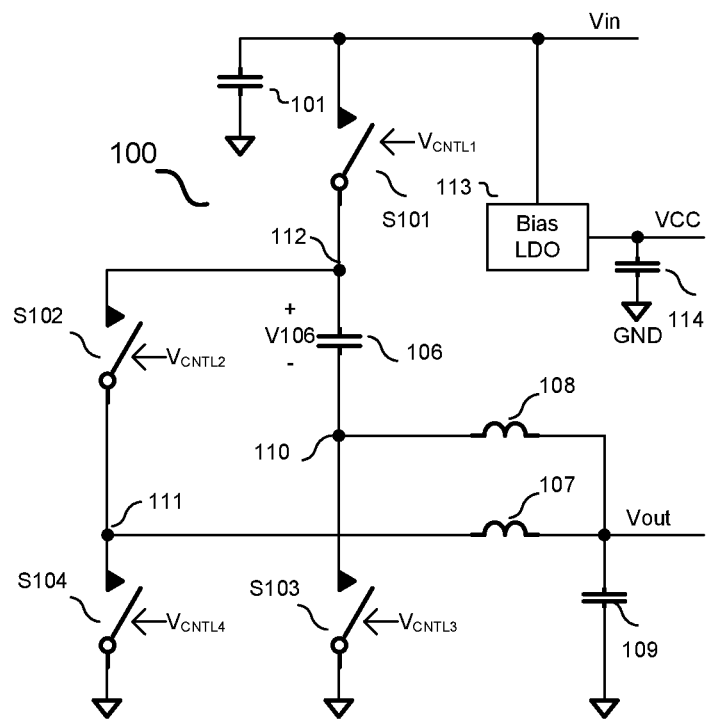
FIG. 1 shows a hybrid converter with a single flying capacitor.
Figure 2:
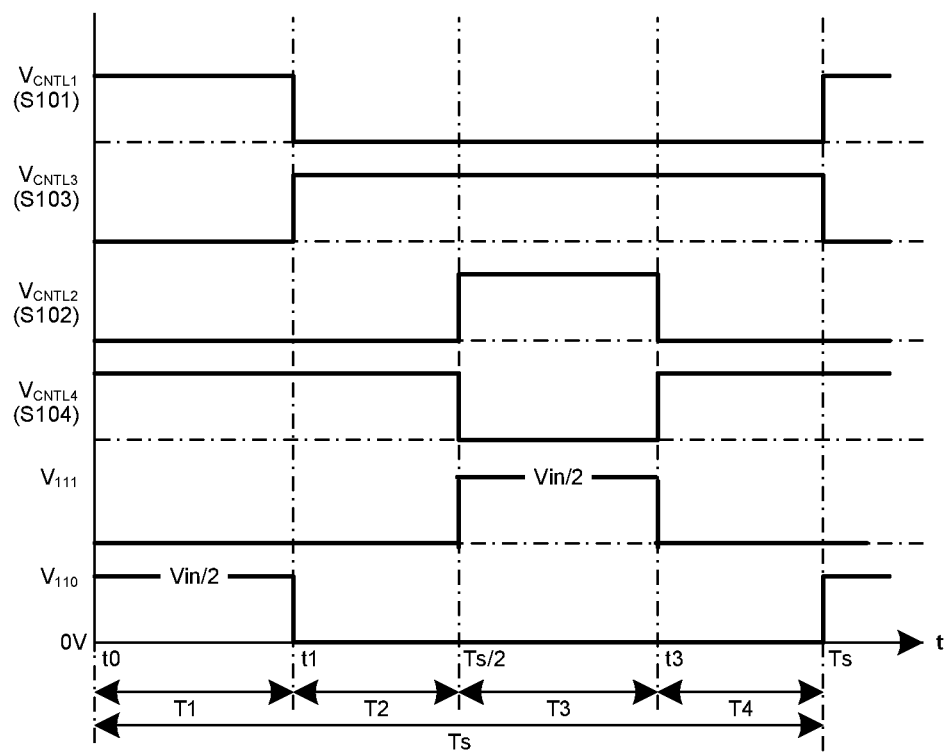
FIG. 2 illustrates various waveforms associated with the hybrid converter shown in FIG. 1.
Figure 3:
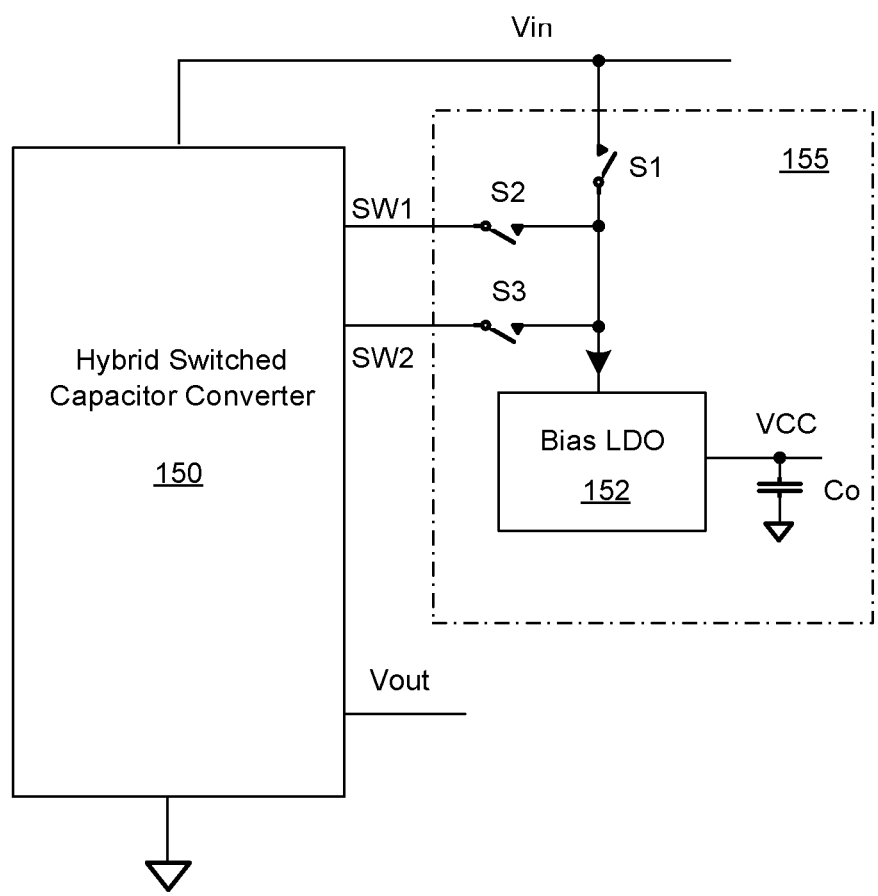
FIG. 3 illustrates a block diagram of a bias power supply apparatus and the associated hybrid switched capacitor converter in accordance with various embodiments of the present disclosure.

FIG. 3 illustrates a block diagram of a bias power supply apparatus and the associated hybrid switched capacitor converter in accordance with various embodiments of the present disclosure. The hybrid switched capacitor converter 150 is connected between an input voltage bus Vin and ground. Two switching nodes SW1 and SW2 of the hybrid switched capacitor converter 150 are connected to the bias power supply apparatus 155. The hybrid switched capacitor converter 150 has an output Vout configured to generate a steady voltage providing power for various loads coupled to the output of the hybrid switched capacitor converter 150.

In some embodiments, the hybrid switched capacitor converter 150 is implemented as a single-phase hybrid switched capacitor converter. The detailed structure and operating principle of this implementation will be described below with respect to FIGS. 4-6. In alternative embodiments, the hybrid switched capacitor converter 150 is implemented as a dual-phase hybrid switched capacitor converter. The detailed structure and operating principle of this implementation will be described below with respect to FIGS. 7-11.

The bias power supply apparatus 155 comprises a first switch S1, a second switch S2, a third switch S3, a bias power regulator 152 and a bias output capacitor Co. In some embodiments, the bias power regulator 152 is implemented as a bias LDO. The bias LDO is configured to convert an input voltage fed into the bias LDO into a suitable bias voltage VCC (e.g., 5 V). Throughout the description, the bias power regulator 152 may be alternatively referred to as a bias LDO 152.

As shown in FIG. 3, the first switch S1 is connected between the input voltage bus Vin and the input of the bias power regulator 152. The second switch S2 is connected between a first switching node SW1 of the hybrid switched capacitor converter 150 and the input of the bias power regulator 152. The third switch S3 is connected between a second switching node SW2 of the hybrid switched capacitor converter 150 and the input of the bias power regulator 152.

In operation, in a startup process, the first switch S1 is turned on, and the second switch S2 and the third switch S3 are turned off. The voltage on the input voltage bus Vin is configured to provide power for the bias power regulator 152. Once the voltages on the switching nodes have been fully established, the voltage on SW1 and/or the voltage on SW2 are configured to provide power for the bias power regulator 152.

In operation, when the hybrid switched capacitor converter 150 is implemented as a single-phase hybrid switched capacitor converter, the second switch S2 and the third switch S3 are configured to operate in two different operating modes (e.g., the first two operating modes described below). When the hybrid switched capacitor converter 150 is implemented as a dual-phase hybrid switched capacitor converter, the second switch S2 and the third switch S3 are configured to operate in three different operating modes (e.g., three operating modes described below).

In a first operating mode, a voltage on the first switching node SW1 is equal to a fraction (e.g., one half) of a voltage on the input voltage bus, and a voltage on the second switching node SW2 is not equal to the fraction (e.g., one half) of the voltage on the input voltage bus. The third switch S3 is configured to be turned off. The second switch S2 is configured to be turned on so that the voltage on the first switching node SW1 is configured to provide power for the bias power regulator 152. The first operating mode is applicable to both the single-phase hybrid switched capacitor converter and the dual-phase hybrid switched capacitor converter.

In a second operating mode, a voltage on the first switching node SW1 is not equal to a fraction (e.g., one half) of a voltage on the input voltage bus, and a voltage on the second switching node SW2 is equal to the fraction (e.g., one half) of the voltage on the input voltage bus. The second switch S2 is configured to be turned off. The third switch S3 is configured to be turned on so that the voltage on the second switching node SW2 is configured to provide power for the bias power regulator 152. The second operating mode is applicable to both the single-phase hybrid switched capacitor converter and the dual-phase hybrid switched capacitor converter.

In a third operating mode, a voltage on the first switching node SW1 is equal to a fraction (e.g., one half) of a voltage on the input voltage bus, and a voltage on the second switching node SW2 is equal to the fraction (e.g., one half) of the voltage on the input voltage bus. Either one of the third switch S3 and the second switch S2 can be configured to be turned on, or both the third switch S3 and the second switch S2 are configured to be turned on so that the voltage on the first switching node SW1 and/or the voltage on the second switching node SW2 are configured to provide power for the bias power regulator 152 separately or concurrently. The third operating mode is applicable to the dual-phase hybrid switched capacitor converter.

The hybrid switched capacitor converter 150 may be implemented as different hybrid switched capacitor converters. Depending on the power topology difference, the voltages on the first switching node and the second switching node may vary accordingly. In operation, the second switch S2 is configured such that when the second switch S2 is turned on, a voltage on the first switching node SW1 is equal to (L/M) of the voltage on the input voltage bus. The third switch S3 is configured such that when the third switch S3 is turned on, a voltage on the second switching node SW2 is equal to (L/M) of the voltage on the input voltage bus. L and M are positive integers. L is less than M. In some embodiments (e.g., the hybrid switched capacitor converter shown in FIG. 4), L is equal to 1. M is equal to 2. In some embodiments (e.g., the hybrid switched capacitor converter shown in FIG. 6), L is equal to 1. M is equal to 3. In some embodiments (e.g., the hybrid switched capacitor converter shown in FIG. 11), L is equal to 2. M is equal to 3.

Figure 4:
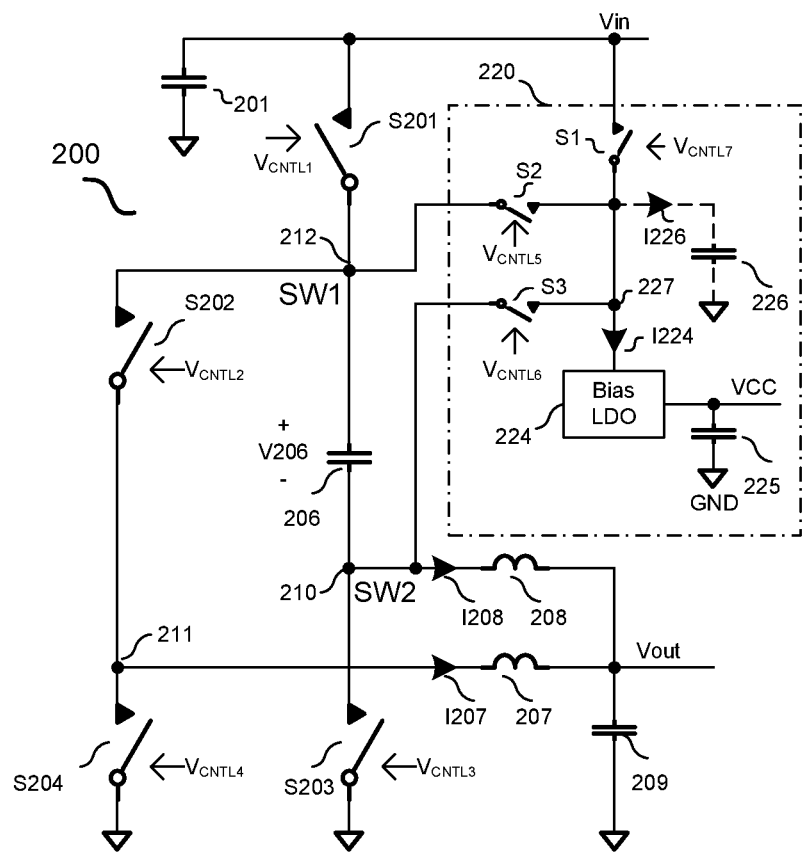
FIG. 4 illustrates a schematic diagram of a first implementation of the hybrid switched capacitor converter shown in FIG. 3 in accordance with various embodiments of the present disclosure.

FIG. 4 illustrates a schematic diagram of a first implementation of the hybrid switched capacitor converter shown in FIG. 3 in accordance with various embodiments of the present disclosure. The power conversion system 200 shown in FIG. 4 comprises a hybrid switched capacitor converter and a bias power supply apparatus 220. The hybrid switched capacitor converter is a single-phase hybrid switched capacitor converter. The hybrid switched capacitor converter comprises an input capacitor 201, a first power switch S201, a second power switch S202, a third power switch S203, a fourth power switch S204, a flying capacitor 206, a first inductor 208, a second inductor 207 and an output capacitor 209. The bias power supply apparatus 220 comprises a first switch S1, a second switch S2, a third switch S3, a bias LDO 224, a bias capacitor 226 and a bias output capacitor 225.

As shown in FIG. 4, the first power switch S201, the flying capacitor 206 and the third power switch S203 are connected in series between the input voltage bus Vin and ground. The second power switch S202 and the fourth power switch S204 are connected in series between a common node of the first power switch S201 and the flying capacitor 206, and ground. The first inductor 208 is connected between a common node of the flying capacitor 206 and the third power switch S203, and an output voltage bus of the hybrid switched capacitor converter. The second inductor 207 is connected between a common node of the second power switch S202 and the fourth power switch S204, and the output voltage bus of the hybrid switched capacitor converter.

Referring back to FIG. 3, the common node 212 of the first power switch S201 and the flying capacitor 206 is the first switching node SW1 of the hybrid switched capacitor converter. The common node 210 of the flying capacitor 206 and the third power switch S203 is the second switching node SW2 of the hybrid switched capacitor converter.

The bias power supply apparatus 220 has three inputs. A first input is the input voltage bus Vin. A second input is the first switching node 212. A third input is the second switching node 210. The bias power regulator 224 is coupled to the input voltage bus Vin through the first switch S1. The bias power regulator 224 is coupled to the first switching node 212 through the second switch S2. The bias power regulator 224 is coupled to second switching node 210 through the third switch S3. The bias capacitor 226 is connected between the input of the bias power regulator 224 and ground.

In operation, before a steady voltage has been established across the flying capacitor 206, the first switch S1 is turned on to power up the bias power regulator 224 to generate a bias voltage VCC. During this time period, the second switch S2 and the third switch S3 are turned off. Once the hybrid switched capacitor converter is in normal operation and the voltage across the flying capacitor 206 is equal to one half of the voltage on the input voltage bus, the first switch S1 is turned off, and the second switch S2 and the third switch S3 are turned on/off alternately based on the switching status of switches S203 and S201. More specifically, the second switch S2 is turned on/off in sync with the third power switch S203. The third switch S3 is turned on/off in sync with an inverted signal of the gate drive signal of the third power switch S203. The second switch S2 and the third switch S3 are configured such that the input voltage of the bias power regulator 224 is maintained at a level equal to one half of Vin. By lowering the input voltage to one half of Vin, the power dissipation can be reduced accordingly. For example, the bias power regulator is an LDO. Vin is equal to 12 V. The output voltage of the bias power regulator 224 is 5 V. The current flowing through the LDO is about 50 mA. If Vin is directly applied to the input of the LDO, the power loss is about 350 milliwatts. In contrast, the control scheme described above can reduce the input voltage of the LDO from 12 V to 6 V. Accordingly, the power loss can be reduced from 350 milliwatts to 50 milliwatts. In some embodiments, the output voltage of the hybrid switched capacitor converter is 0.7 V. The load current of the hybrid switched capacitor converter is about 50 A. The reduced power loss (300 milliwatts) may improve the efficiency of the hybrid switched capacitor converter by about 1%.

Figure 5:
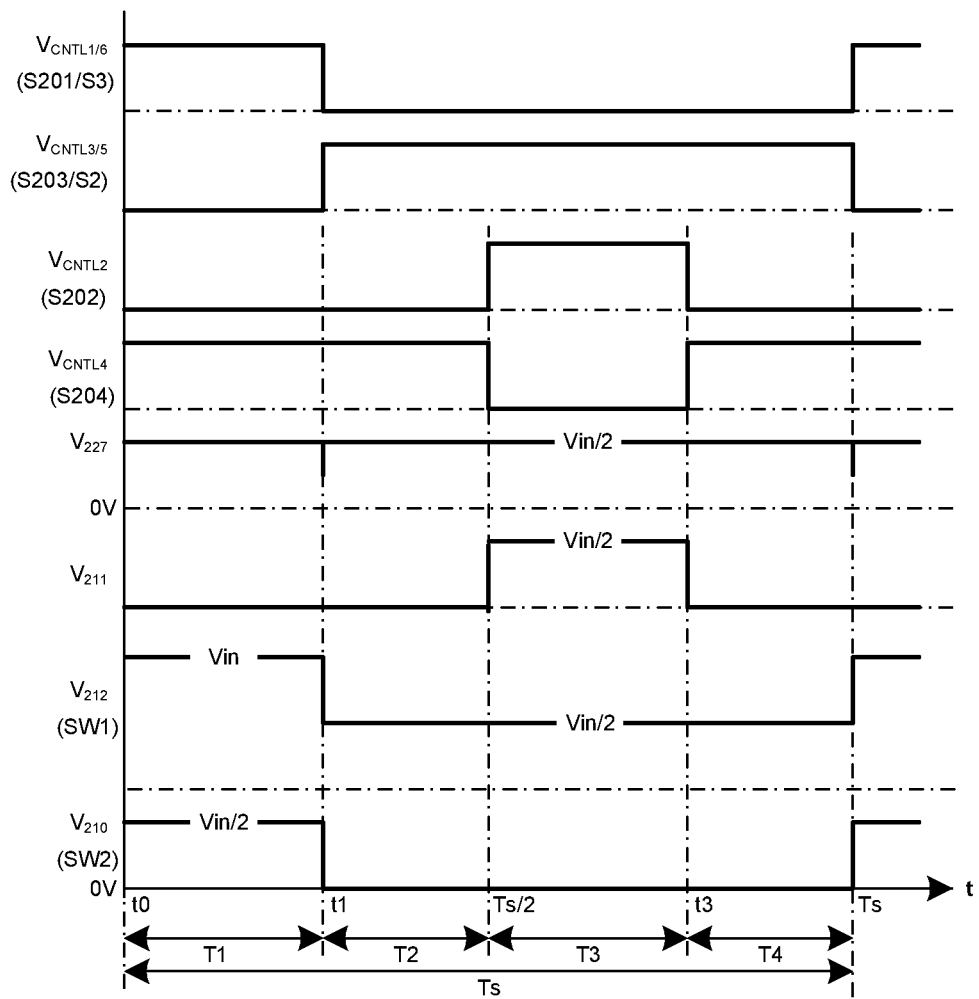
FIG. 5 illustrates various waveforms associated with the circuit shown in FIG. 4 in accordance with various embodiments of the present disclosure.

FIG. 5 illustrates various waveforms associated with the circuit shown in FIG. 4 in accordance with various embodiments of the present disclosure. The horizontal axis of FIG. 5 represents intervals of time. There may be eight rows in FIG. 5. The first row represents the gate drive signals of the first power switch S201 and the third switch S3. The second row represents the gate drive signals of the third power switch S203 and the second switch S2. The third row represents the gate drive signal of the second power switch S202. The fourth row represents the gate drive signal of the fourth power switch S204. The fifth row represents the voltage on the input node 227 of the bias LDO 224. The sixth row represents the voltage on the node 211. The seventh row represents the voltage on the node 212 (SW1). The eighth row represents the voltage on the node 210 (SW2).

A switching period Ts of the hybrid switched capacitor converter includes four consecutive time intervals. A first time interval T1 is from t0 to t1. A second time interval T2 is from t1 to Ts/2. A third time interval T3 is from Ts/2 to t3. A fourth time interval T4 is from t3 to Ts.

According to the operating principle of the single-phase hybrid switched capacitor converter, in normal operation, the voltage V206 across the flying capacitor 206 is equal to one half of the input voltage Vin.

In operation, before a steady voltage has been established across the flying capacitor 206, the first switch S1 is turned on to power up the bias power regulator 224 to generate a bias voltage VCC. During this time period, the second switch S2 and the third switch S3 are turned off. Once the hybrid switched capacitor converter is in normal operation and the voltage across the flying capacitor 206 is equal to one half of the voltage on the input voltage bus, the first switch S1 is turned off, and the second switch S2 and the third switch S3 are turned on/off alternately.

In the first time interval T1, the gate drive signals indicate that the first power switch S201, the fourth power switch S204 and the third switch S3 are turned on. The second power switch S202, the third power switch S203 and the second switch S2 are turned off. Since S204 is turned on, the voltage on the node 211 is equal to zero. Since S201 is turned on, the voltage on the first switching node 212 is equal to Vin. The voltage across the flying capacitor 206t is equal to Vin/2. As such, the voltage on the second switch node 210 is equal to Vin/2. In the first time interval T1, the third switch S3 is turned on. The voltage on the second switching node 210 is configured to provide power for the bias power regulator 224. In other words, the bias power regulator 224 draws power from the input voltage bus through S201 and the flying capacitor 206. The voltage on the node 227 is equal to Vin/2. The voltage difference between the input voltage Vin and the voltage on the node 227 is dropped across the flying capacitor 206. Instead of dissipating the power in the bias power regulator 224, the current I224 flowing through the bias power regulator 224 charges the flying capacitor 206 to store the energy in the flying capacitor 206.

In a second time interval T2, the gate drive signals indicate that the third power switch S203, the fourth power switch S204 and the second switch S2 are turned on. The first power switch S201, the second power switch S202 and the third switch S3 are turned off. Since S203 is turned on, the voltage on the second switching node 210 is equal to zero. Since S204 is turned on, the voltage on the node 211 is equal to zero. The voltage on the first switching node 212 is equal to Vin/2. In the second time interval T2, the second switch S2 is turned on. The flying capacitor 206 coupled to the first switching node 212 is configured to provide power for the bias power regulator 224. In the second time interval T2, the flying capacitor 206 is discharged by the current I224 flowing through the bias power regulator 224.

In the second time interval T2, the third switch S3 is turned off to prevent the voltage on the node 227 from being pulled down to ground by the third power switch S203. The second switch S2 is turned on to maintain the voltage on the node 227 equal to Vin/2.

In the third time interval T3, the gate drive signals indicate that the second power switch S202, the third power switch S203 and the second switch S2 are turned on. The first power switch S201, the fourth power switch S204 and the third switch S3 are turned off. Since S203 is turned on, the voltage on the second switching node 210 is equal to zero. The voltage across the flying capacitor 206t is equal to Vin/2. The voltage on the first switching node 212 is equal to Vin/2. Since S202 is turned on, the voltage on the node 211 is equal to Vin/2. The flying capacitor 206 coupled to the first switching node 212 is configured to provide power for the bias power regulator 224. In the third time interval T3, the flying capacitor 206 is discharged by both the current I224 flowing through the bias power regulator 224 and the current I207 flowing through the inductor 207.

In the fourth time interval T4, the gate drive signals indicate that the third power switch S203, the fourth power switch S204 and the second switch S2 are turned on. The first power switch S201, the second power switch S202 and the third switch S3 are turned off. Since S203 is turned on, the voltage on the second switching node 210 is equal to zero. Since S204 is turned on, the voltage on the node 211 is equal to zero. The voltage on the first switching node 212 is equal to Vin/2. In the fourth time interval T2, the second switch S2 is turned on. The flying capacitor 206 coupled to the first switching node 212 is configured to provide power for the bias power regulator 224. In the fourth time interval T2, the flying capacitor 206 is discharged by the current I224 flowing through the bias power regulator 224.

As shown in FIG. 5, the gate drive signal of the second switch S2 is the same as the gate drive signal for the third power switch S203. The gate drive signal for the third switch S3 is the same as the gate drive signal for the first power switch S201 and complementary to the gate drive signal for the third power switch S203.

The current flowing through the bias LDO 224 charges the flying capacitor 206 in the first time interval T1 and discharges the flying capacitor 206 during the rest of the switching period. This means that due to the bias LDO current I224, the net charge on the flying capacitor 206 is not equal to zero, resulting in the decrease of the average voltage across the flying capacitor 206. The speed of the decrease of the voltage V206 across the flying capacitor 206 can be very slow since the bias LDO current is much smaller than the output current of the hybrid switched capacitor converter.

The decrease in the flying capacitor voltage V206 can be corrected by the output inductor current. Due to the decrease of the flying capacitor voltage V206 by the bias LDO current I224, the voltage V206 is less than Vin/2. The variation in V206 causes the inductor current I208 increasing and the inductor current I207 decreasing. Such a difference between two inductor currents I208 and I207 creates an equivalent net current. In the T1 interval, the equivalent net current flows from the input Vin, the first power switch S201, the flying capacitor 206, the inductors 208, 207, the fourth power switch S204, and returns to the input from ground. In the T3 interval, the equivalent net current flows in a loop formed by the second power switch S202, the flying capacitor 206, the inductors 207 and 208. The net equivalent current charges the flying capacitor 206. As a result, the voltage V206 can be maintained at Vin/2 during the normal operation at the cost of having a slight difference between the two inductor currents I208 and I207. The difference between the two inductor currents I208 and I207 depends on the bias LDO current I224. This difference can be expressed by following equation:

$$\Delta IL = I208 - I207 = I224 \times \left(\frac{1}{D} - 2\right) \quad (5)$$

In Equation (5), D is equal to T1/Ts or T3/Ts. D is in a range from 0 to 0.5. From Equation (5), the worst case happens at a small duty cycle. For example, when D is equal to 0.1 and the bias LDO current is equal to 50 mA, the current difference is equal to 400 mA. On the other hand, when D is equal to 0.3, the current difference is reduced to 67 mA, which is significantly less than the full load inductor current (e.g., full load inductor current in a range from 20 A to 30 A). Therefore, at a relatively large duty cycle, for example, D is equal to 0.23 and the power conversion is from 12 V to 0.7 V. The difference between inductor current I208 and I207 is acceptable. In some applications, this current difference may not be acceptable. One additional capacitor 226 can be added to the input node 227. In this case, the current charging the flying capacitor 206 is the sum of the inductor current I208, the bias LDO current I224, and the current I226 of the capacitor 226. The capacitor 226 is charged during the T1 interval. During the T3 interval, the discharging current of the flying capacitor 206 is equal to the sum of the inductor current I207, the bias LDO current I224, and the current I226 of the capacitor 226. During the T2 and T4 intervals, the flying capacitor 206 supplies the bias LDO current I224 only. The amplitude of the capacitor current I226 is equal to ΔIL/2. Due to the addition of the capacitor 226, the charging current seen by the flying capacitor 206 is increased by ΔIL/2 during the T1 interval and is decreased by ΔIL/2 during T3 interval, resulting in a zero average current over one switching cycle. Thus, the voltage across the flying capacitor 206 can be maintained at a constant voltage level equal to Vin/2.

It should be noted that the addition of the capacitor 226 also introduces an additional function of maintaining the voltage across the flying capacitor 206 equal to Vin/2 under various operating conditions (e.g., temporary unbalance of the output inductor currents I208 and I224 caused by various unknown reasons). The capacitor 226 can also eliminate the voltage glitch occurred during on/off transitions of switches S2 and S3.

In some applications where a higher input voltage is used (e.g., 18 V), the hybrid switched capacitor converter shown in FIG. 4 can be expanded to achieve a higher voltage conversion ratio by adding a plurality of expansion units.

Figure 6:
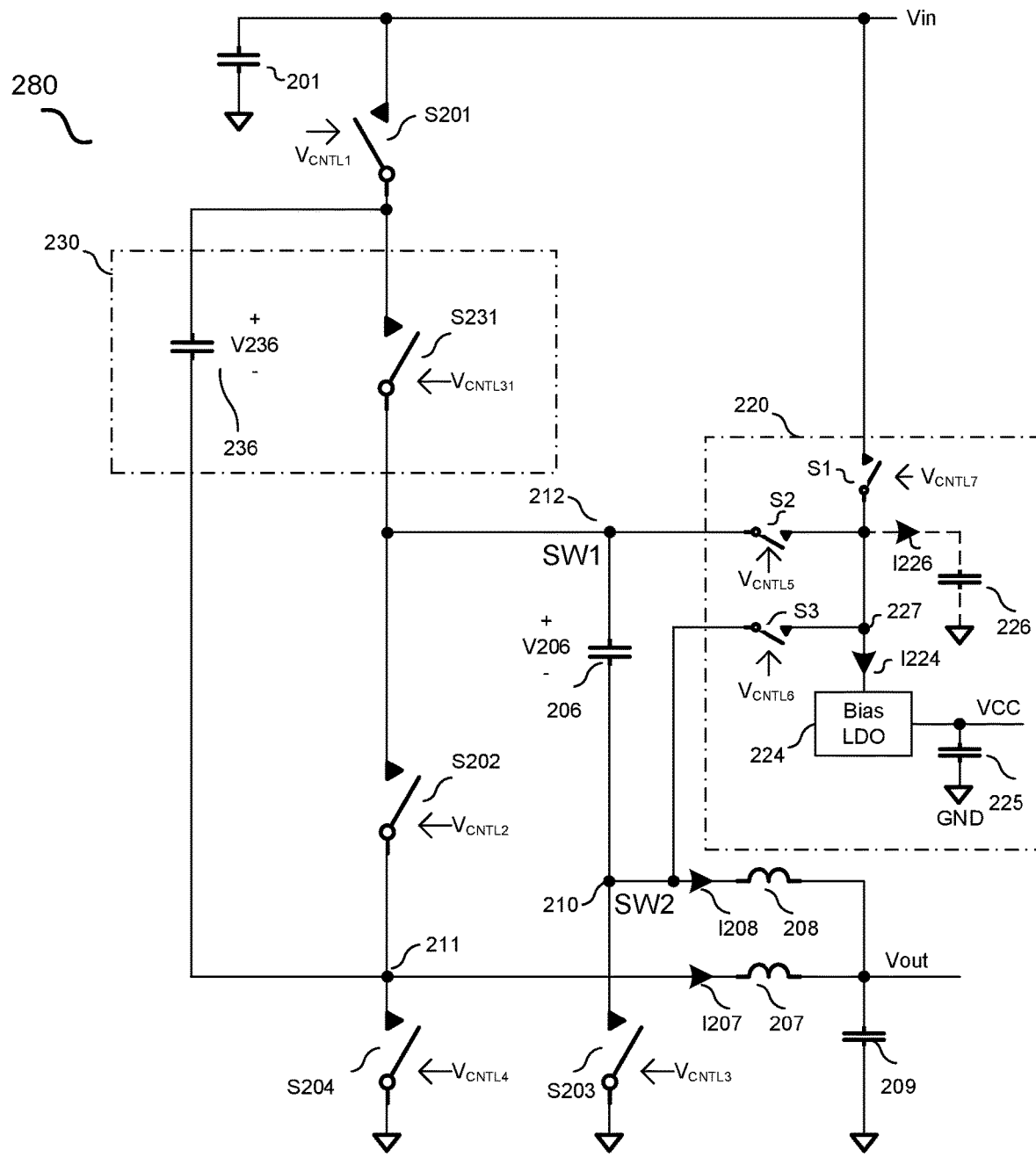
FIG. 6 illustrates a schematic diagram of a second implementation of the hybrid switched capacitor converter shown in FIG. 3 in accordance with various embodiments of the present disclosure.

FIG. 6 illustrates a schematic diagram of a second implementation of the hybrid switched capacitor converter shown in FIG. 3 in accordance with various embodiments of the present disclosure. The power conversion system 280 shown in FIG. 6 comprises a hybrid switched capacitor converter and a bias power supply apparatus 220. The hybrid switched capacitor converter shown in FIG. 6 is similar to the hybrid switched capacitor converter shown in FIG. 4 except that an expansion unit 230 is added.

As shown in FIG. 6, the expansion unit 230 comprises a first expansion power switch S231 and a first expansion flying capacitor 236. As shown in FIG. 6, the first power switch S201, the first expansion power switch S231, the second power switch S202 and the third power switch S203 are connected in series between the input voltage bus Vin and ground. The first expansion flying capacitor 236 is connected between a common node of the second power switch S202 and the fourth power switch S204, and a common node of the first power switch S201 and the first expansion power switch S231.

In steady state operation, the first power switch S201 and the second power switch S202 are configured to turned on and off at the same time. The first expansion power switch S231 and the third switch S3 are configured to turn on and off at the same time. The second switch S2 and the third power switch S203 are configured to turned on and off together, complementary to the first expansion power switch S231. The fourth power switch S204 and the second power switch S202 operate in a complementary fashion. The first power switch S201 and the first expansion power switch S231 operate out of phase.

According to the operating principle of the single-phase hybrid switched capacitor converter, in normal operation, the voltage V206 across the flying capacitor 206 is equal to one third of the input voltage Vin, and the voltage V236 across the flying capacitor 236 is equal to two thirds of the input voltage Vin.

In operation, before a steady voltage has been established across the flying capacitor 206, the first switch S1 is turned on to power up the bias power regulator 224 to generate a bias voltage VCC. During this time period, the second switch S2 and the third switch S3 are turned off. Once the hybrid switched capacitor converter is in normal operation and the voltage across the flying capacitor 206 is equal to one third of the voltage on the input voltage bus, the first switch S1 is turned off, and the second switch S2 and the third switch S3 are turned on/off alternately based on the switching status of power switch S203. More specifically, the second switch S2 is turned on/off the same time as the third power switch S203, and the third switch S3 is turned on/off the same time as the first expansion power switch S231, which is complementary to the third power switch S203. The second switch S2 and the third switch S3 are configured such that the input voltage of the bias power regulator 224 is maintained at a level equal to one third of Vin. In some high voltage applications (e.g., 18 V), by lowering the input voltage to one third of Vin (6 V), the power dissipation can be reduced accordingly.

Similarly, the single-phase hybrid switched capacitor converter shown in FIG. 6 may include N cascading expansion units 230 to offer a voltage conversion ratio (between VIN and the peak voltage at node SW2) of (N+2):1. Regardless of the voltage conversion ratio, the second switch S2 can always be connected to the common node of the second power switch S202 and the flying capacitor 206 (e.g., first switching node SW1 shown in FIG. 6). The third switch S3 can always be connected to the common node of the third power switch S203 an and the flying capacitor 206 (e.g., second switching node SW2 shown in FIG. 6).

During steady state operation, the second switch S2 is turned on/off the same time as the third power switch S203. In other words, the second switch S2 is turned on and off in sync with the third power switch S203. The third switch S3 is turned on/off complementary to the third power switch S203. S2 and S3 are configured such that input voltage of the bias power regulator 224 is maintained at a level equal to 1/(N+2) of Vin. By lowering the input voltage to 1/(N+2) of Vin, the power dissipation can be reduced accordingly.

As described above, through cascading different number of expansion units 230 to the single-phase hybrid switched capacitor converter and connecting the second and third switches to the two terminals of the flying capacitor (e.g., flying capacitor 206) connected to the third power switch S203, all unit fractions (½, ⅓, ¼, etc.) of the input voltage Vin can be supplied to the bias power regulator 224 during steady state operation. The various input voltage options of the bias power regulator 224 offer flexibility to designers in achieving a higher efficiency power conversion for power converters having a very wide input voltage range.

Figure 7:
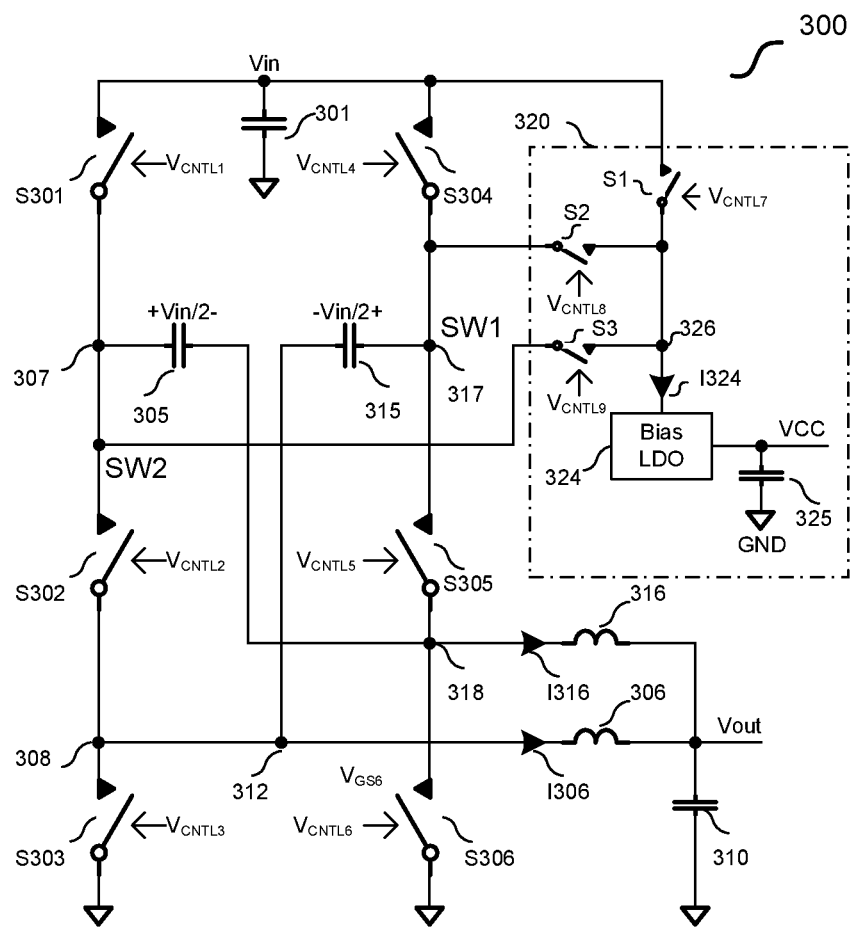
FIG. 7 illustrates a schematic diagram of a third implementation of the hybrid switched capacitor converter shown in FIG. 3 in accordance with various embodiments of the present disclosure.

FIG. 7 illustrates a schematic diagram of a third implementation of the hybrid switched capacitor converter shown in FIG. 3 in accordance with various embodiments of the present disclosure. The power conversion system 300 shown in FIG. 7 comprises a hybrid switched capacitor converter and a bias power supply apparatus 320. The hybrid switched capacitor converter is a dual-phase hybrid switched capacitor converter. The hybrid switched capacitor converter comprises an input capacitor 301, a first power switch S301, a second power switch S302, a third power switch S303, a fourth power switch S304, a fifth power switch S305, a sixth power switch S306, a first flying capacitor 305, a second flying capacitor 315, a first inductor 306, a second inductor 316 and an output capacitor 310. The bias power supply apparatus 320 comprises a first switch S1, a second switch S2, a third switch S3, a bias LDO 324 and a bias output capacitor 325.

As shown in FIG. 7, the first power switch S301, the second power switch S302 and the third power switch S303 are connected in series between the input voltage bus Vin and ground. The fourth power switch S304, the fifth power switch S305 and the sixth power switch S306 are connected in series between the input voltage bus Vin and ground. The first flying capacitor 305 is connected between a common node 307 of the first power switch S301 and the second power switch S302, and a common node 318 of the fifth power switch S305 and the sixth power switch S306. The second flying capacitor 315 is connected between a common node 317 of the fourth power switch S304 and the fifth power switch S305, and a common node 308 of the second power switch S302 and the third power switch S303. The first inductor 306 is connected between the common node 308 of the second power switch S302 and the third power switch S303, and an output voltage bus Vout of the hybrid switched capacitor converter. The second inductor 316 is connected between the common node 318 of the fifth power switch S305 and the sixth power switch S306, and the output voltage bus Vout of the hybrid switched capacitor converter.

Referring back to FIG. 3, the common node 317 of the fourth power switch S304 and the fifth power switch S305 is the first switching node SW1 of the hybrid switched capacitor converter. The common node 307 of the first power switch S301 and the second power switch S302 is the second switching node SW2 of the hybrid switched capacitor converter.

In operation, before a steady voltage has been established across the flying capacitors 305 and 315, the first switch S1 is turned on to power up the bias power regulator 324 to generate a bias voltage VCC. During this time period, the second switch S2 and the third switch S3 are turned off. Once the hybrid switched capacitor converter is in normal operation and the voltages across the flying capacitors 305 and 315 are equal to one half of the voltage on the input voltage bus, the first switch S1 is turned off, and the second switch S2 and the third switch S3 are turned on/off based on the switching status of switches S303 and S306, respectively. The second switch S2 and the third switch S3 are configured such that the input voltage of the bias power regulator 324 is maintained at a level equal to one half of Vin.

Figure 8:
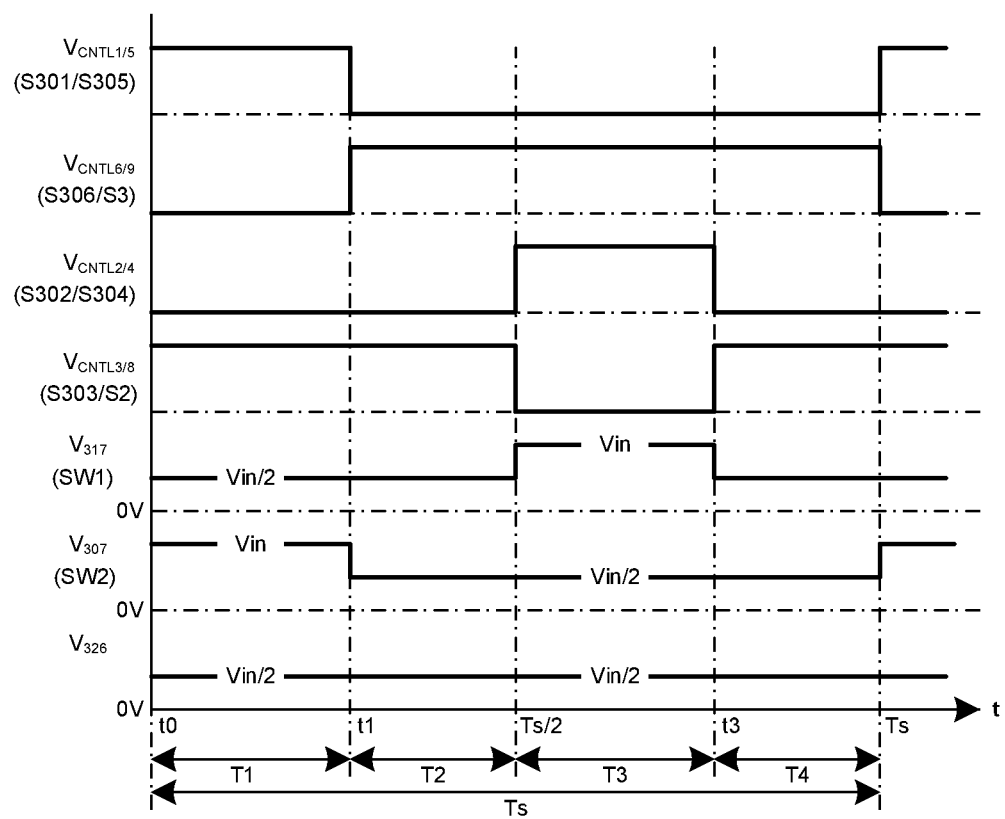
FIG. 8 illustrates various waveforms associated with the circuit shown in FIG. 7 in accordance with various embodiments of the present disclosure.

FIG. 8 illustrates various waveforms associated with the circuit shown in FIG. 7 in accordance with various embodiments of the present disclosure. The horizontal axis of FIG. 8 represents intervals of time. There may be seven rows in FIG. 8. The first row represents the gate drive signals of the first power switch S301 and the fifth power switch S305. The second row represents the gate drive signals of the sixth power switch S306 and the third switch S3. The third row represents the gate drive signals of the second power switch S302 and the fourth power switch S304. The fourth row represents the gate drive signals of the third power switch S303 and the second switch S2. The fifth row represents the voltage on the node 317 (the first switching node SW1). The sixth row represents the voltage on the node 307 (the second switching node SW2). The seventh row represents the voltage on the input 326 of the bias LDO 324.

A switching period of the hybrid switched capacitor converter includes four consecutive time intervals. A first time interval T1 is from t0 to t1. A second time interval T2 is from t1 to Ts/2. A third time interval T3 is from Ts/2 to t3. A fourth time interval T4 is from t3 to Ts.

According to the operating principle of the dual-phase hybrid switched capacitor converter, the voltage across the first flying capacitor 305 is equal to one half of the input voltage Vin as shown in FIG. 7. Likewise, the voltage across the second flying capacitor 315 is equal to one half of the input voltage Vin as shown in FIG. 7.

In the first time interval T1, the gate drive signals indicate that the first power switch S301, the third power switch S303, the fifth power switch S305 and the second switch S2 are turned on. The second power switch S302, the fourth power switch S304, the sixth switch S306 and the third switch S3 are turned off. Since S301 is turned on, the voltage on the node 307 is equal to Vin. Since S303 is turned on, the voltage on the node 317 is equal to Vin/2. S2 is turned on. The voltage on the node 317 is fed into the bias power regulator 324. As such, the voltage on the node 326 is equal to Vin/2. In the first time interval T1, the second flying capacitor 315 coupled to the first switching node 317 is configured to provide power for the bias power regulator 324.

In the second time interval T2, the gate drive signals indicate that third power switch S303, the sixth power switch S306, the second switch S2 and the third switch S3 are turned on. The first power switch S301, the second power switch S302, the fourth power switch S304 and the fifth switch S305 are turned off. Since S303 and S306 are turned on, the voltages on the first switching node 317 and the second switching node 307 are equal to one half of the voltage on the input voltage bus. Both the first flying capacitor 305 and the second flying capacitor 315 are configured to provide power for the bias power regulator 324.

In the third time interval T3, the gate drive signals indicate that the second power switch S302, the fourth power switch S304, the sixth switch S306 and the third switch S3 are turned on. The first power switch S301, the third power switch S303, the fifth power switch S305 and the second switch S2 are turned off. Since S304 is turned on, the voltage on the node 317 is equal to Vin. Since S306 is turned on, the voltage on the node 307 is equal to Vin/2. S3 is turned on. The voltage on the node 307 is fed into the bias power regulator 324. As such, the voltage on the node 326 is equal to Vin/2. In the third time interval T3, the first flying capacitor 305 coupled to the second switching node 307 is configured to provide power for the bias power regulator 324.

In the fourth time interval T4, the gate drive signals indicate that third power switch S303, the sixth power switch S306, the second switch S2 and the third switch S3 are turned on. The first power switch S301, the second power switch S302, the fourth power switch S304 and the fifth switch S305 are turned off. Since S303 and S306 are turned on, the voltages on the first switching node 317 and the second switching node 307 are equal to one half of the voltage on the input voltage bus. Both the first flying capacitor 305 and the second flying capacitor 315 are configured to provide power for the bias power regulator 324.

In operation, the flying capacitor 305 is charged by the inductor current I316 during the T1 interval, and is discharged by partial of the bias LDO current I324 during the rest of the switching period. On the other hand, the flying capacitor 315 is charged by the inductor current I306 during the T3 interval, and is discharged by partial of the bias LDO current I324 during the rest of the switching period. The operation of the dual-phase hybrid switched capacitor converter is not disturbed by powering the bias LDO 324 from the flying capacitors 305 and 315. Since both switches S2 and S3 are turned on during the intervals T2 and T4, there is not glitch at the input node 326 during the switching transitions of the switches S2 and S3. Thus, there is no need to add an additional capacitor at the input node 326.

Figure 9:
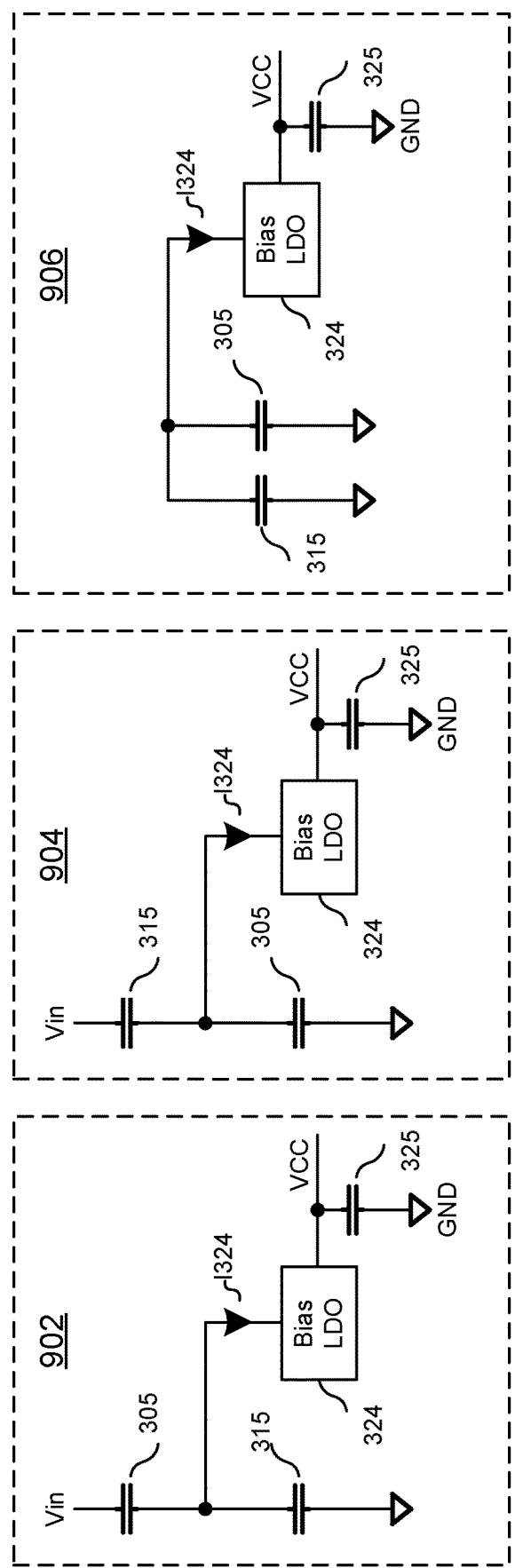
FIG. 9 shows three different operating modes of the circuit shown in FIG. 7 in accordance with various embodiments of the present disclosure.

FIG. 9 shows three different operating modes of the circuit shown in FIG. 7 in accordance with various embodiments of the present disclosure. Referring back to FIGS. 7-8, during T1, S301, S303 and S305 are turned on. The first flying capacitor 305 and the second flying capacitor 315 are connected in series between Vin and ground. The voltage across the second flying capacitor 315 is fed into the bias LDO 324. The equivalent circuit of this flying capacitor configuration is shown in the dashed rectangle 902.

Referring back to FIGS. 7-8, during T3, S302, S304 and S306 are turned on. The second flying capacitor 315 and the first flying capacitor 305 are connected in series between Vin and ground. The voltage across the first flying capacitor 305 is fed into the bias LDO 324. The equivalent circuit of this flying capacitor configuration is shown in the dashed rectangle 904.

Referring back to FIGS. 7-8, during T2 and T4, S303 and S306 are turned on. The first flying capacitor 305 and the second flying capacitor 315 are connected in parallel. Both S2 and S3 are turned on. Both the voltage across the first flying capacitor 305 and the voltage across the second flying capacitor 315 are fed into the bias LDO 324 concurrently. The equivalent circuit of this flying capacitor configuration is shown in the dashed rectangle 906.

As shown in the dashed rectangles 902 and 904, the two flying capacitors are connected in series. This means that if the sum of the voltages across the two flying capacitors is less than Vin, a charging current from the input Vin to ground charges the flying capacitors to make the sum of their voltages equal to Vin. The bias LDO input drawing power from the flying capacitors does not disturb the normal operation of the dual-phase hybrid switched capacitor converter.

In operation, if the voltages across the flying capacitors 305 and 315 are close to the regulation voltage of the bias power supply apparatus 320 due to the variations of the input voltage, the bias LDO 324 operates in a dropout state. The output capacitor 325 and the two flying capacitors 305 and 315 are configured to function as a dual-phase charge pump having very high operation efficiency. If the voltages across the flying capacitors 305 and 315 are much lower than the regulation voltage of the bias power supply apparatus 320, the switches S2 and S3 are turned off, and the switch S1 is turned on to keep the output voltage of the bias power supply apparatus 320 in regulation.

In some implementations of the dual phase hybrid switched capacitor converter shown in FIG. 7, the second switch S2 and third switch S3 are configured to be turned on and off alternately, to provide one half of the voltage of the input voltage bus to the bias LDO 324 separately. In this scenario, the second switch S2 is no longer turning on and off completely in sync with the power switch S303. Instead, the second switch S2 only turns off in sync with the power switch S303 and turns on in sync with the power switches S301 and S305. Similarly, the third switch S3 is no longer turning on and off completely in sync with the power switch S306. Instead, the third switch only turns off in sync with the power switch S306, and turns on in sync with the power switches S302 and S304. In this way, for switches S2 and S3, each switch conducts during one half of the switching period Ts, and switches S2 and S3 alternately provide one half of the power fed into the bias LDO 324. The benefit of having this configuration is to avoid the charge sharing loss associated with connecting the flying capacitors 305 and 315 in parallel (as shown in state 906 of FIG. 9). When switches S2 and S3 are turned on alternately, the circuit connection alternates between the state 902 and the state 904 as shown in FIG. 9, avoiding parallel connections of flying capacitors 305 and 315, thereby preventing in-rush current and charge sharing losses associated with connecting two capacitors with slightly different voltages in parallel.

In a more general case, as long as the second switch S2 is configured such that when it is turned on, a voltage on the first switching node SW1 is equal to one half of a voltage on the input voltage bus. The third switch S3 is configured such that when it is turned on, a voltage on the second switching node SW2 is equal to one half of a voltage on the input voltage bus. At least one of the second switch S2 and the third switch S3 is turned on during the entire switching period Ts. A consistent one half of a voltage on the input voltage bus can be provided to the bias LDO 324 to achieve higher efficiency during steady state operation.

Figure 10:
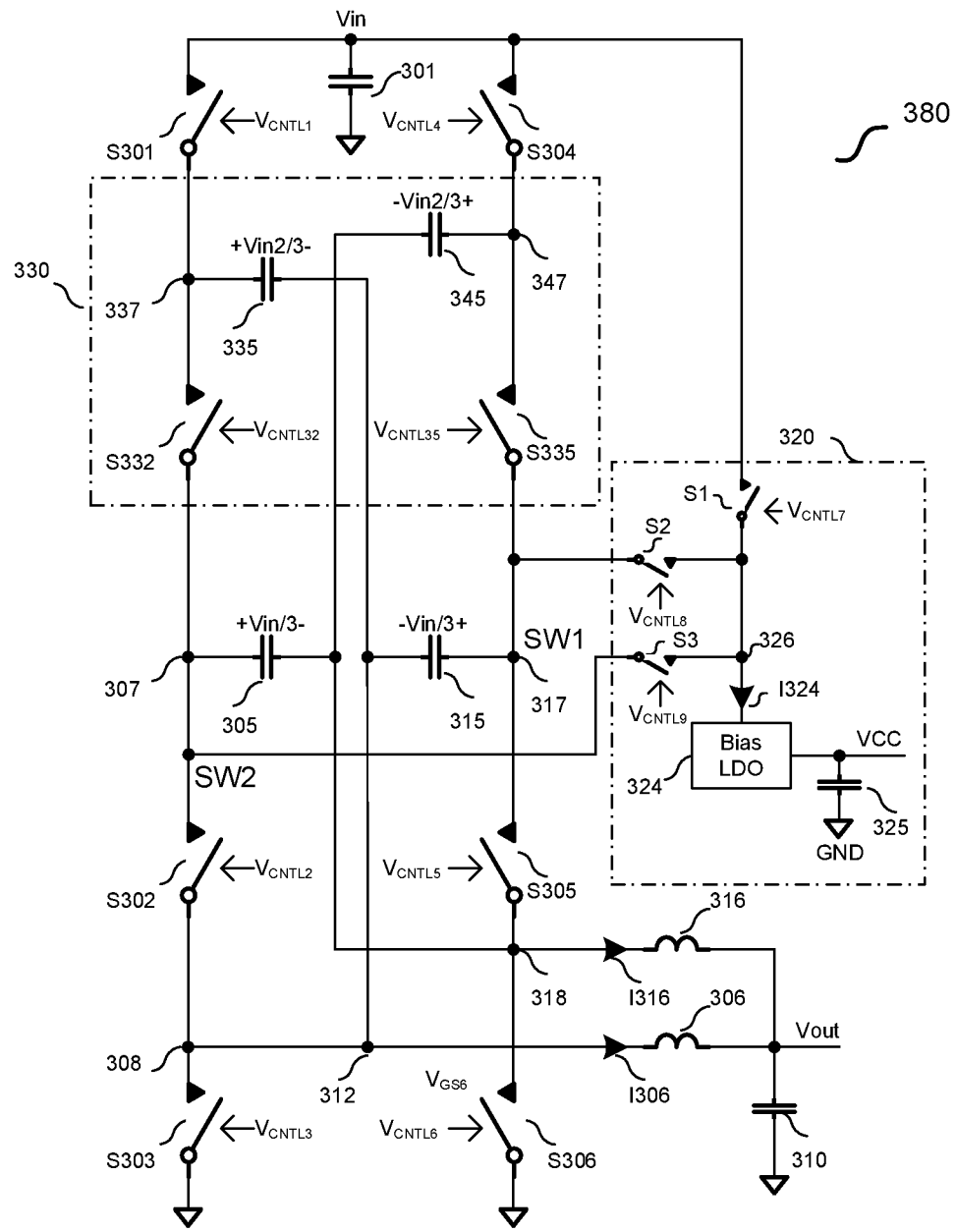
FIG. 10 illustrates a schematic diagram of a fourth implementation of the hybrid switched capacitor converter shown in FIG. 3 in accordance with various embodiments of the present disclosure.
Figure 11:
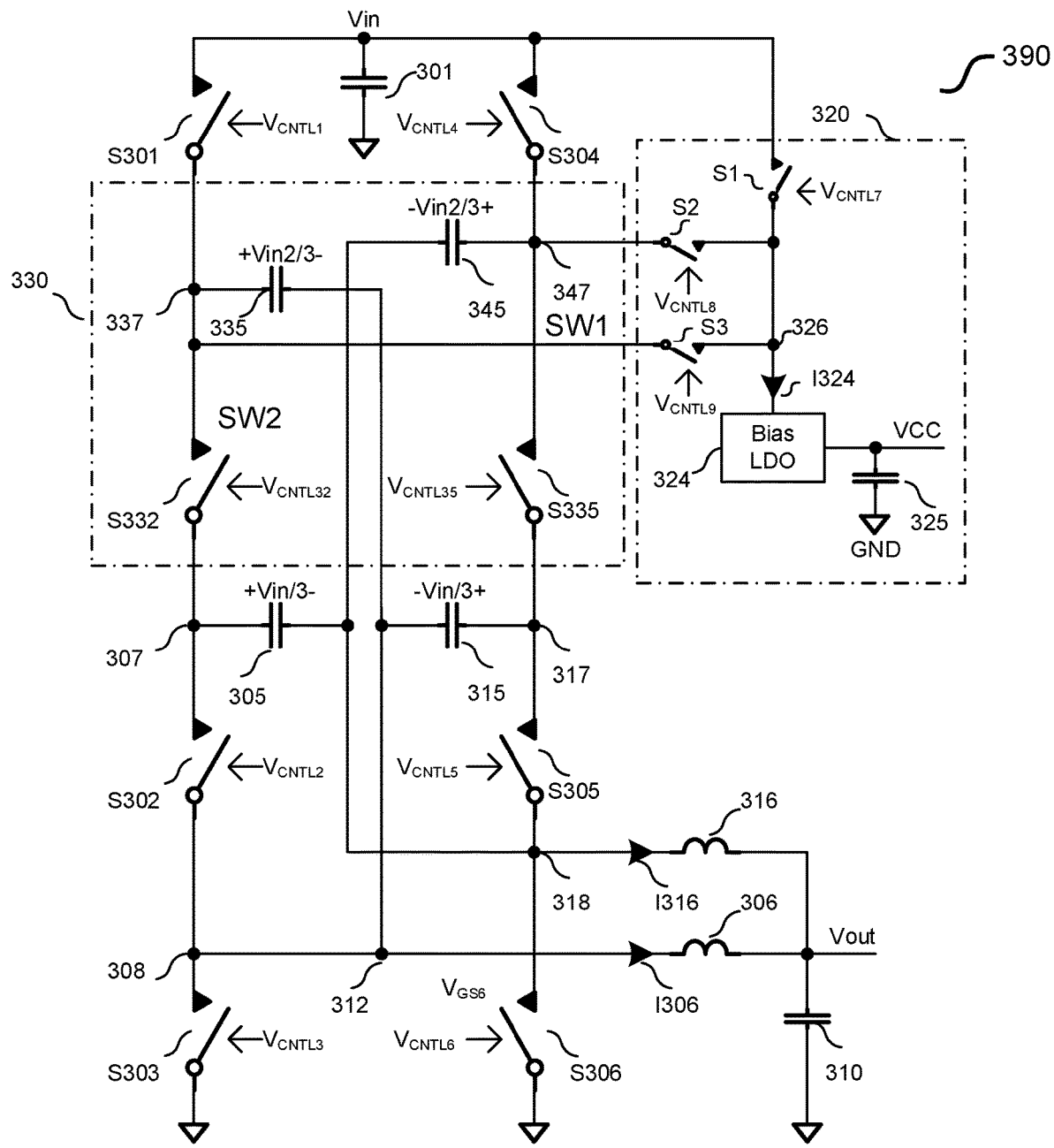
FIG. 11 illustrates a schematic diagram of a fifth implementation of the hybrid switched capacitor converter shown in FIG. 3 in accordance with various embodiments of the present disclosure.

The hybrid switched capacitor converter shown in FIG. 7 can be expanded to higher voltage conversion ratios by adding dual-phase expansion units as shown in FIGS. 10-11. By adding the expansion unit 330, the peak voltage at nodes 308 and 318 changes from one half of the voltage on the input voltage bus (Vin) to one third of Vin.

FIG. 10 illustrates a schematic diagram of a fourth implementation of the hybrid switched capacitor converter shown in FIG. 3 in accordance with various embodiments of the present disclosure. The power conversion system 380 shown in FIG. 10 comprises a hybrid switched capacitor converter and a bias power supply apparatus 320. The hybrid switched capacitor converter shown in FIG. 10 is similar to the hybrid switched capacitor converter shown in FIG. 7 except that a dual-phase expansion unit 330 is added to adjust the power conversion ratio from 2:1 to 3:1.

As shown in FIG. 10, the dual-phase expansion unit 330 comprises a first expansion power switch S332, a second expansion power switch S335 a first expansion flying capacitor 335 and a second expansion flying capacitor 345.

As shown in FIG. 10, the first power switch S301, the first expansion power switch S332, the second power switch S302 and the third power switch S303 are connected in series between the input voltage bus Vin and ground. The first expansion flying capacitor 335 is connected between a common node of the second power switch S302 and the third power switch S303, and a common node of the first power switch S301 and the first expansion power switch S332.

As shown in FIG. 10, the fourth power switch S304, the second expansion power switch S335, the fifth power switch S335 and the sixth power switch S306 are connected in series between the input voltage bus Vin and ground. The second expansion flying capacitor 345 is connected between a common node of the fifth power switch S305 and the sixth power switch S306, and a common node of the fourth power switch S304 and the second expansion power switch S335.

In steady state operation, the first power switch S301, the second power switch S302 and the second expansion power switch S335 are configured to turned on and off at the same time with a duty cycle D. The fourth power switch S304, the first expansion power switch S332 and the fifth power switch S305 are configured to turned on and off at the same time, out of phase with the first power switch S301 with the same duty cycle D. The third power switch S303 and the second switch S2 turn on and off at the same time and operate in a complementary fashion with respect to the second power switch S302. The sixth power switch S306 and the third switch S3 turn on and off at the same time and operate in a complementary fashion with respect to the fifth power switch S305.

According to the operating principle of the dual-phase hybrid switched capacitor converter, in steady state operation, the voltages across the flying capacitors 305 and 315 are both equal to one third of the input voltage Vin. The voltages across the first expansion flying capacitor 335 and second expansion flying capacitor 345 are both equal to two thirds of the input voltage Vin.

In operation, before a steady voltage has been established across the flying capacitors 305 and 315, the first switch S1 is turned on to power up the bias power regulator 324 to generate a bias voltage VCC. During this time period, the second switch S2 and the third switch S3 are turned off. Once the dual-phase hybrid switched capacitor converter 380 is in normal operation and the voltages across the flying capacitors 305 and 315 are equal to one third of the voltage on the input voltage bus, the first switch S1 is turned off, and the second switch S2 and the third switch S3 are turned on/off alternately based on the switching status of power switches S303 and S306. More specifically, the second switch S2 is turned on/off together with the third power switch S303, and the third switch S3 is turned on/off the together with the sixth power switch S306. The second switch S2 and the third switch S3 are configured such that the input voltage of the bias power regulator 324 is maintained at a level equal to one third ($\frac{1}{3}$) of Vin. By lowering the input voltage to one third of Vin, the power dissipation can be reduced accordingly.

Similarly, the dual-phase hybrid switched capacitor converter shown in FIG. 10 can include N cascading expansion units 330 to offer a voltage conversion ratio (VIN/the peak voltage at node 308 and/or VIN/the peak voltage at node 318) of (N+2):1. Regardless of the voltage conversion ratio, the second switch S2 can always be connected to the common node of the fifth power switch S305 and the flying capacitor 315 (e.g., first switching node SW1 shown in FIG. 10). The third switch S3 can always be connected to the common node of the second power switch S302 an and the flying capacitor 305 (e.g., second switching node SW2 shown in FIG. 10).

During steady state operation, the second switch S2 is turned on/off at the same time as the third power switch S303. The third switch S3 is turned on/off at the same time as the sixth power switch S306. The second switch S2 and the third switch S3 are configured such that input voltage of the bias power regulator 324 is maintained at a level equal to 1/(N+2) of Vin. By lowering the input voltage to 1/(N+2) of Vin, the power dissipation can be reduced accordingly.

As described above, through cascading different number of expansion units 330 to the dual-phase hybrid switched capacitor converter 300 in FIG. 7, connecting the second switch S2 to the terminal of flying capacitor 315 that is not connected to an output inductor, and connecting the third switch S3 to the terminal of flying capacitor 305 that is not connected to an output inductor, all unit fractions ($\frac{1}{2}$, $\frac{1}{3}$, $\frac{1}{4}$, etc.) of the input voltage Vin can be supplied to the bias power regulator 324 during steady state operation. The various input voltage options of the bias power regulator 324 offer flexibility to designers in achieving a higher efficiency power conversion for power converters having a very wide input voltage range.

FIG. 11 illustrates a schematic diagram of a fifth implementation of the hybrid switched capacitor converter shown in FIG. 3 in accordance with various embodiments of the present disclosure. The power conversion system 390 shown in FIG. 11 comprises a hybrid switched capacitor converter and a bias power supply apparatus 320. The hybrid switched capacitor converter shown in FIG. 11 is similar to the hybrid switched capacitor converter shown in FIG. 10 except that S2 and S3 are connected to expansion flying capacitors 345 and 335, respectively. Since the voltages across the expansion flying capacitors 335 and 345 are equal to the unit fraction of Vin multiplied by an integer, the configuration shown in FIG. 11 allows non-unit fractions (e.g., ⅔) of Vin to be supplied to the bias power regulator 324.

As shown in FIG. 11, the second switch S2 is connected to the terminal of second expansion flying capacitor 345 that is not connected to an output inductor. The third switch S3 is connected to the terminal of first expansion flying capacitor 335 that is not connected to an output inductor. During steady state operation, the second switch S2 is turned on/off in sync with the sixth power switch S306. The third switch S3 is turned on/off in sync with the third power switch S303.

In operation, since the voltages across the expansion flying capacitors 345 and 335 are equal to two thirds (⅔) of the input voltage Vin, two thirds (⅔) of Vin can be continuously supplied to the bias power regulator 324 during steady state operation. This is uniquely useful for hybrid converters with a 12-V input voltage and a bias voltage of 5 V. In this application, the input to the bias LDO can be reduced to 8V instead of 12V during steady state in order to achieve higher efficiency.

When a plurality of (e.g., N) dual-phase expansion units are added to the dual-phase hybrid switched capacitor converter in a cascading fashion, a pair of the expansion flying capacitors carrying 1/(N+2) of Vin multiplied by an integer can be selected, where the terminals of the expansion flying capacitors that are not connected to an output inductor can be assigned as the two switching node SW1 and SW2 respectively to supply fractions of Vin through the second switch S2 and third switch S3 to the bias LDO 324 during steady state operation.

Figure 12:
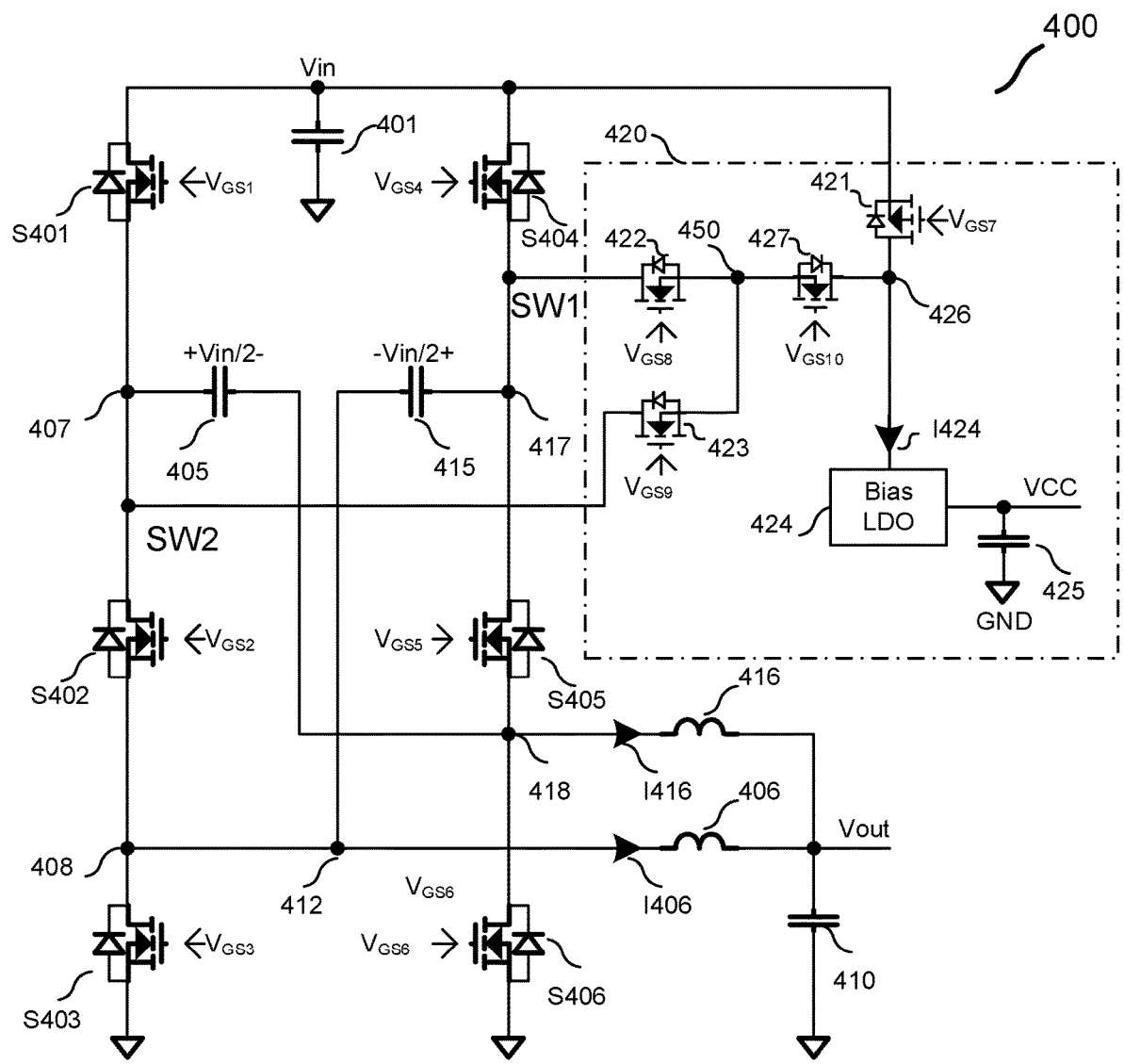
FIG. 12 shows one example of implementing the switches in the bias power supply apparatus in accordance with various embodiments of the present disclosure.

In some implementations of the dual phase hybrid switched capacitor converter shown in FIG. 11 and FIG. 12, the second switch S2 and third switch S3 can be configured to be turned on and off alternately, to connect a fraction of the input voltage bus carried by a pair of flying capacitors to the bias LDO 324 separately. In this way, each of the switches S2 and S3 conducts during one half of the switching period Ts. The benefit of having this configuration is to avoid the charge sharing loss associated with connecting the flying two capacitors in parallel, thereby eliminating the associated in-rush current and charge sharing losses.

In a more general case, as long as the second switch S2 is configured such that when it is turned on, a voltage on the first switching node SW1 is equal to a fraction of a voltage on the input voltage bus. The third switch S3 is configured such that when it is turned on, a voltage on the second switching node SW2 is equal to the same fraction of voltage on the input voltage bus. At least one of the second switch S2 and the third switch S3 is turned on during the entire switching period Ts. A stable voltage, representing a fraction of the voltage on the input voltage bus, can be provided to the bias LDO 324 to achieve higher efficiency during steady state operation.

FIG. 12 shows one example of implementing the switches in the bias power supply apparatus in accordance with various embodiments of the present disclosure. The power conversion system 400 shown in FIG. 12 comprises a hybrid switched capacitor converter and a bias power supply apparatus 420. The hybrid switched capacitor converter is a dual-phase hybrid switched capacitor converter. The hybrid switched capacitor converter comprises an input capacitor 401, a first power switch S401, a second power switch S402, a third power switch S403, a fourth power switch S404, a fifth power switch S405, a sixth power switch S406, a first flying capacitor 405, a second flying capacitor 415, a first inductor 406, a second inductor 416 and an output capacitor 410. The bias power supply apparatus 420 comprises a first switch 421, a second switch 422, a third switch 423, a fourth switch 427, a bias LDO 424 and a bias output capacitor 425. The operating principle of the hybrid switched capacitor converter shown in FIG. 12 is similar to that of the hybrid switched capacitor converter shown in FIG. 7, and hence is not discussed again to avoid repetition.

As shown in FIG. 12, the first switch 421 is a first MOSFET. The second switch 422, the third switch 423 and the fourth switch 427 form two isolation switches. As shown in FIG. 12, the second switch 422 is a second MOSFET connected between the first switching node SW1 and an internal node 450. The third switch 423 is a third MOSFET connected between the second switching node SW2 and the internal node 450. The fourth switch 427 is a fourth MOSFET connected between the internal node 450 and the input of the bias power regulator. As shown in FIG. 12, the second MOSFET and the fourth MOSFET are back-to-back connected to each other to form a first isolation switch. The third MOSFET and the fourth MOSFET are back-to-back connected to each other to form a second isolation switch.

In operation, due to the body diodes the switches 422 and 423, the switch 427 is added to prevent the input voltage Vin from being applied to the flying capacitors 405 and 415 through the body diodes of the switches 422 and 423. More particularly, when the switch 421 is turned on to power up the bias LDO 424 initially, without having the switch 427, the input voltage Vin is applied to the flying capacitors 405 and 415 through the body diodes of the switches 423 and 422, respectively. In normal operation, the voltage across the flying capacitor is one half of the input voltage. If the switch 427 is not added, the flying capacitors are charged to the input voltage Vin once the switch 421 is turned on. The high voltage across the flying capacitors can cause damage to the hybrid switched capacitor converter.

In normal operation, the voltage across the flying capacitors reaches Vin/2. The switch 421 can be turned off and the switch 427 can be turned on. The voltage at the input node 426 starts to decrease and is then clamped by the flying capacitors at Vin/2 through the switches 422 and 423. The switches 422 and 423 are turned on and off by the same control signals for the switches S403 and S406, respectively.

Figure 13:
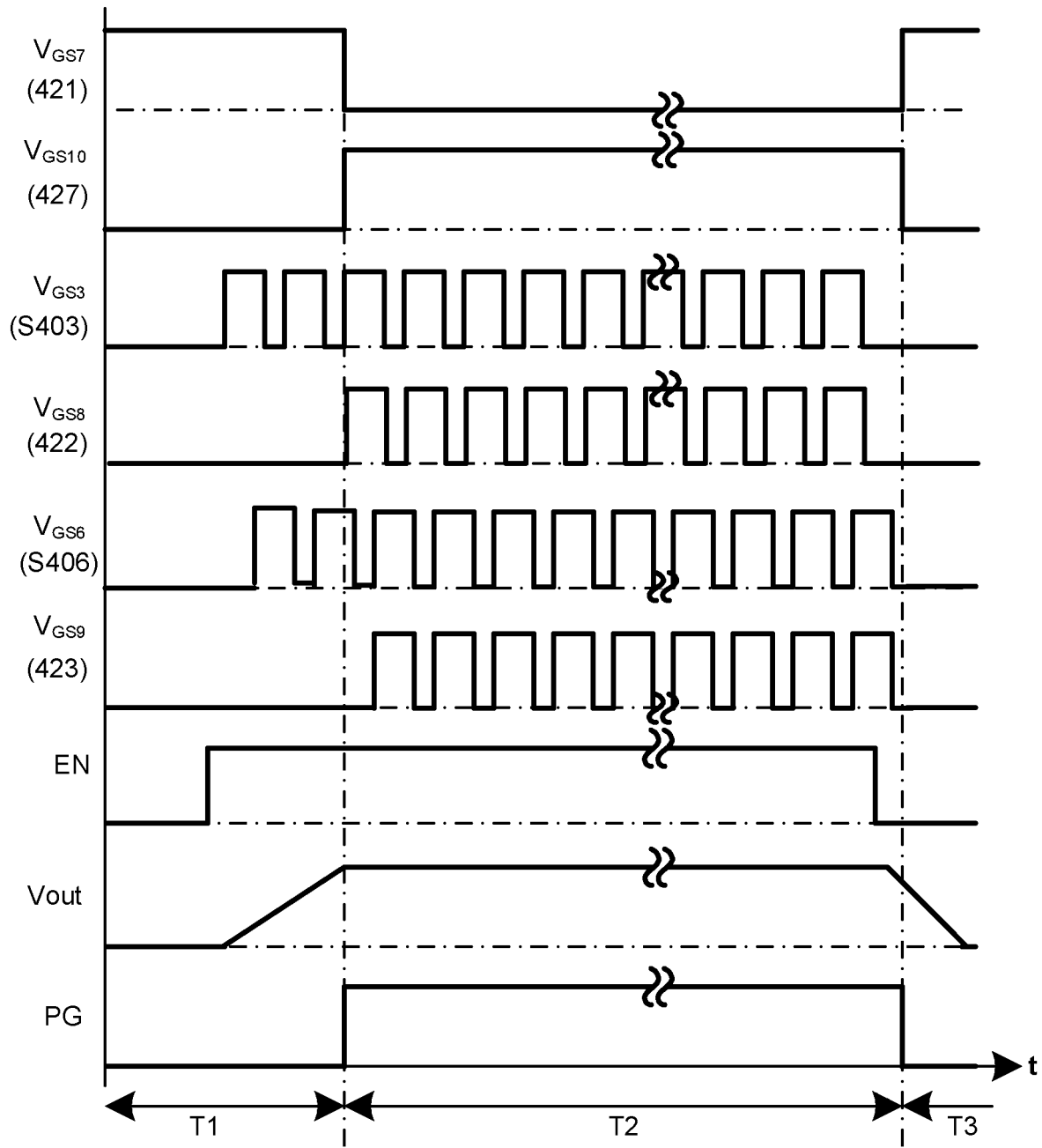
FIG. 13 illustrates various waveforms associated with the circuit shown in FIG. 12 in accordance with various embodiments of the present disclosure.

FIG. 13 illustrates various waveforms associated with the circuit shown in FIG. 12 in accordance with various embodiments of the present disclosure. The horizontal axis of FIG. 13 represents intervals of time. There may be nine rows in FIG. 13. The first row represents the gate drive signal of switch 421. The second row represents the gate drive signal of switch 427. The third row represents the gate drive signal of switch S403. The fourth row represents the gate drive signal of switch 422. The fifth row represents the gate drive signal of switch S406. The sixth row represents the gate drive signal of switch 423. The seventh row represents an enable (EN) signal. The enable signal is employed to turn on the hybrid switched capacitor converter. The eighth row represents an output voltage Vout of the hybrid switched capacitor converter. The ninth row is a power good (PG)

signal. The PG signal is configured to be high when the output voltage is in regulation and to be low when the output voltage is not in regulation.

There are three significant intervals shown in FIG. 13. T1 represents the soft start interval of the hybrid switched capacitor converter. T2 represents the normal operation interval. T3 represents the power off interval. During the T1 interval, initially the switch 421 is turned on to generate the VCC voltage from the input Vin. During the T1 interval, the rest of the switches are kept off before the enable signal changes from a logic low state to a logic high state. Once the enable signal has a logic high state, the switches S401, S402, S403, S404, S405 and S406 start switching. The output voltage Vout starts to rise. Before the PG signal changes from a logic low state to a logic high state, the switches 422, 423 and 427 are kept off by the PG signal. Once the output voltage Vout reaches regulation, the PG signal goes high. In response to the logic state change of the PG signal, the switch 421 is turned off and the switch 427 is turned on. At the same time, the switches 422 and 423 are turned on and off in sync with the on and off of the switches S403 and S406, respectively, to supply Vin/2 voltage to the input node 426, from the flying capacitors 415 and 405. The hybrid switched capacitor converter enters the T2 interval. When the EN signal is pulled low, the hybrid switched capacitor converter starts powering off its output. Once the output voltage is below the PG low threshold, the PG signal goes low. As shown in FIG. 13, at this time instant, the switch 427 is turned off, and the switch 421 is turned on. Thus, the bias LDO 424 is powered from the input Vin again. Meanwhile, the switches 422 and 423 are kept off by the PG signal. The hybrid switched capacitor converter enters the third interval T3.

Figure 14:
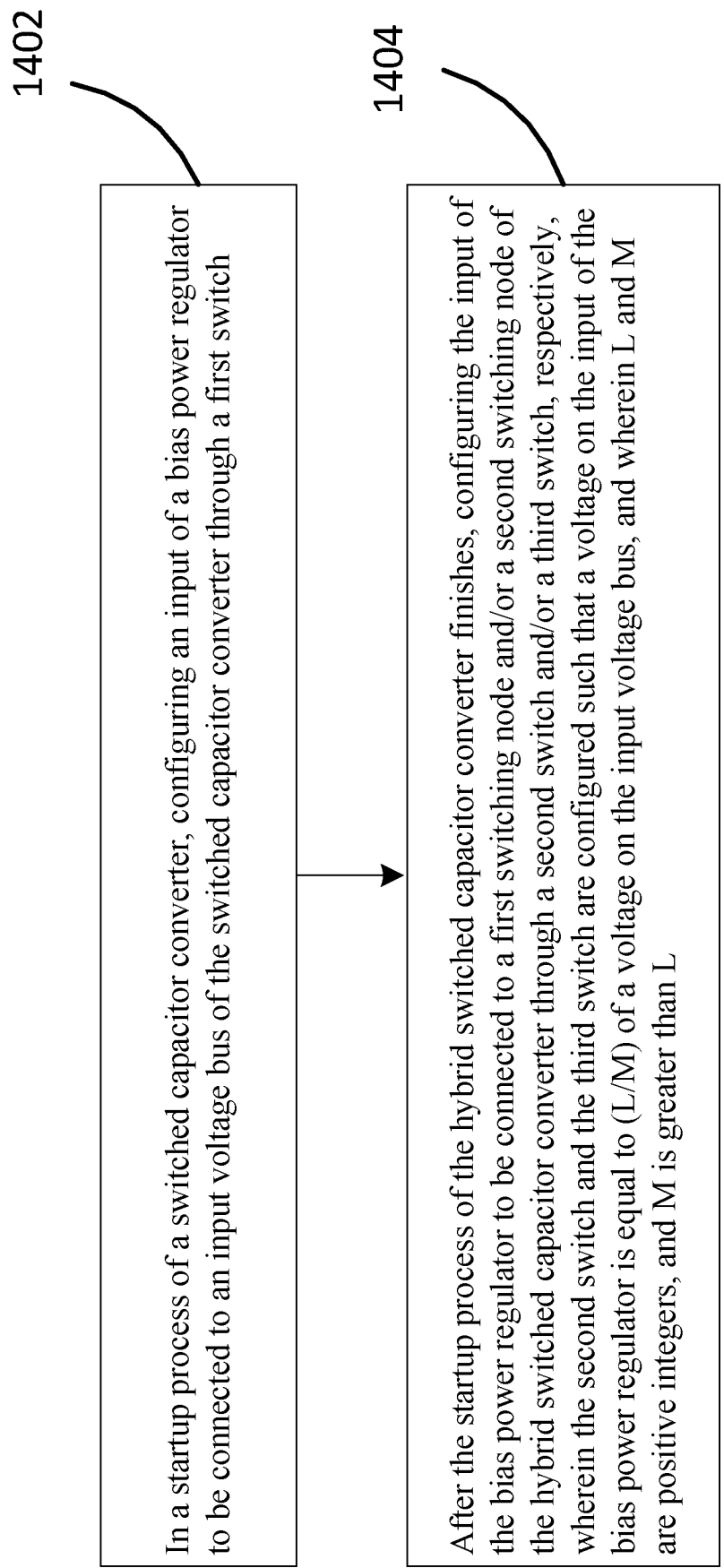
FIG. 14 illustrates a flow chart of controlling the bias power supply apparatus shown in FIG. 3 in accordance with various embodiments of the present disclosure.

FIG. 14 illustrates a flow chart of controlling the bias power supply apparatus shown in FIG. 3 in accordance with various embodiments of the present disclosure. This flowchart shown in FIG. 14 is merely an example, which should not unduly limit the scope of the claims. One of ordinary skill in the art would recognize many variations, alternatives, and modifications. For example, various steps illustrated in FIG. 14 may be added, removed, replaced, rearranged and repeated.

At step 1402, in a startup process of a hybrid switched capacitor converter, an input of a bias power regulator is configured to be connected to an input voltage bus of the hybrid switched capacitor converter through a first switch.

At step 1404, after the startup process of the hybrid switched capacitor converter finishes, the input of the bias power regulator is configured to be connected to a first switching node and/or a second switching node of the hybrid switched capacitor converter through a second switch and/or a third switch, respectively. The second switch and the third switch are configured such that a voltage on the input of the bias power regulator is equal to (L/M) of a voltage on the input voltage bus. L and M are positive integers, and M is greater than L.

Referring back to FIG. 4, the hybrid switched capacitor converter comprises a flying capacitor and a third power switch connected in series between the first switching node and ground, and a first power switch having a first drain/source terminal connected to the input voltage bus and a second drain/source terminal coupled to the first switching node, a second power switch and a fourth power switch connected in series between the first switching node and ground, a first inductor connected between a common node of the flying capacitor and the third power switch, and an output voltage bus of the hybrid switched capacitor converter, and wherein the common node of the flying capacitor and the third power switch is the second switching node, and a second inductor connected between a common node of the second power switch and the fourth power switch, and the output voltage bus of the hybrid switched capacitor converter.

Referring back to FIG. 5, the method further comprises after the startup process of the hybrid switched capacitor converter finishes, configuring the second switch to turn on and off in sync with the third power switch, and configuring the third switch to turn on and off complementary to the second switch, wherein the second switch and the third switch are configured such that the voltage on the input of the bias power regulator is equal to one half of the voltage on the input voltage bus.

Referring back to FIG. 6, the hybrid switched capacitor converter further comprises an expansion unit connected between the first power switch and the first switching node, and wherein the expansion unit comprises an expansion power switch connected between the first power switch and the first switching node, and an expansion flying capacitor connected between a common node of the first power switch and the expansion power switch, and the common node of the second power switch and the fourth power switch.

Referring back to FIG. 6, the method further comprises after the startup process of the hybrid switched capacitor converter finishes, configuring the second switch to turn on and off in sync with the third power switch, and configuring the third switch to turn on and off complementary to the second switch, wherein the second switch and the third switch are configured such that the voltage on the input of the bias power regulator is equal to one third of the voltage on the input voltage bus.

Referring back to FIG. 7, the hybrid switched capacitor converter comprises a second power switch and a third power switch connected in series between the second switching node and ground, and a first power switch having a first drain/source terminal connected to the input voltage bus and a second drain/source terminal coupled to the second switching node, a fifth power switch and a sixth power switch connected in series between the first switching node and ground, and a fourth power switch having a first drain/source terminal connected to the input voltage bus and a second drain/source terminal coupled to the first switching node, a first flying capacitor connected between the second switching node, and a common node of the fifth power switch and the sixth power switch, a second flying capacitor connected between the first switching node, and a common node of the second power switch and the third power switch, a first inductor connected between the common node of the second power switch and the third power switch, and an output voltage bus of the hybrid switched capacitor converter and a second inductor connected between the common node of the fifth power switch and the sixth power switch, and the output voltage bus of the hybrid switched capacitor converter.

Referring back to FIG. 7, the method further comprises after the startup process of the hybrid switched capacitor converter finishes, configuring the second switch and the third switch to turn on and off alternately such that the voltage on the input of the bias power regulator is equal to one half of the voltage on the input voltage bus.

Referring back to FIG. 8, the method further comprises after the startup process of the hybrid switched capacitor converter finishes, configuring the second switch to turn on and off in sync with the third power switch, and configuring the third switch to turn on and off in sync with the sixth power switch, wherein the second switch and the third switch are configured such that the voltage on the input of the bias power regulator is equal to one half of the voltage on the input voltage bus.

Referring back to FIG. 10, the hybrid switched capacitor converter further comprises an expansion unit connected to the first switching node and the second switching node, wherein the expansion unit comprises a first expansion power switch connected between the first power switch and the second switching node, a second expansion power switch connected between the fourth power switch and the first switching node, a first expansion flying capacitor connected between a common node of the first power switch and the first expansion power switch, and the common node of the second power switch and the third power switch, and a second expansion flying capacitor connected between a common node of the fourth power switch and the second expansion power switch, and the common node of the fifth power switch and the sixth power switch.

Referring back to FIG. 10, the method further comprises after the startup process of the hybrid switched capacitor converter finishes, configuring the second switch to turn on and off in sync with the third power switch, and configuring the third switch to turn on and off in sync with the sixth power switch, wherein the second switch and the third switch are configured such that the voltage on the input of the bias power regulator is equal to one third of the voltage on the input voltage bus.

Referring back to FIG. 11, the hybrid switched capacitor converter comprises a second power switch and a third power switch connected in series between a first internal node and ground, and a first power switch having a first drain/source terminal connected to the input voltage bus and a second drain/source terminal coupled to the first internal node, a fifth power switch and a sixth power switch connected in series between a second internal node and ground, and a fourth power switch having a first drain/source terminal connected to the input voltage bus and a second drain/source terminal coupled to the second internal node, a first flying capacitor connected between the first internal node, and a common node of the fifth power switch and the sixth power switch, a second flying capacitor connected between the second internal node, and a common node of the second power switch and the third power switch, a first inductor connected between the common node of the second power switch and the third power switch, and an output voltage bus of the hybrid switched capacitor converter, a second inductor connected between the common node of the fifth power switch and the sixth power switch, and the output voltage bus of the hybrid switched capacitor converter, and an expansion unit comprising a first expansion power switch connected between the first power switch and the first internal node, wherein a common node of the first power switch and the first expansion power switch is the second switching node, a second expansion power switch connected between the fourth power switch and the second internal node, wherein a common node of the second expansion power switch and the fourth power switch is the first switching node, a first expansion flying capacitor connected between a common node of the first power switch and the first expansion power switch, and the common node of the second power switch and the third power switch, and a second expansion flying capacitor connected between a common node of the fourth power switch and the second expansion power switch, and the common node of the fifth power switch and the sixth power switch.

Referring back to FIG. 11, the method further comprises after the startup process of the hybrid switched capacitor converter finishes, configuring the second switch to turn on and off in sync with the sixth power switch, and configuring the third switch to turn on and off in sync with the third power switch, wherein the second switch and the third switch are configured such that the voltage on the input of the bias power regulator is equal to two thirds of the voltage on the input voltage bus.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
 a first switch connected between an input voltage bus of a hybrid switched capacitor converter and an input of a bias power regulator;
 a second switch connected between a first switching node of the hybrid switched capacitor converter and the input of the bias power regulator, wherein the second switch is configured such that when the second switch is turned on, a voltage on the first switching node is equal to (L/M) of a voltage on the input voltage bus; and
 a third switch connected between a second switching node of the hybrid switched capacitor converter and the input of the bias power regulator, wherein the third switch is configured such that when the third switch is turned on, a voltage on the second switching node is also equal to (L/M) of the voltage on the input voltage bus, and wherein L and M are positive integers, and L is less than M.

2. The apparatus of claim 1, wherein the hybrid switched capacitor converter is a single-phase hybrid converter comprising:
 a flying capacitor and a third power switch connected in series between the first switching node and ground, and a first power switch having a first drain/source terminal connected to the input voltage bus and a second drain/source terminal coupled to the first switching node;
 a second power switch and a fourth power switch connected in series between the first switching node and ground;
 a first inductor connected between a common node of the flying capacitor and the third power switch, and an output voltage bus of the hybrid switched capacitor converter, and wherein the common node of the flying capacitor and the third power switch is the second switching node; and a second inductor connected between a common node of the second power switch and the fourth power switch, and the output voltage bus of the hybrid switched capacitor converter, and wherein:
  the second switch is configured to be turned on when the voltage on the first switching node is equal to (1/M) of the voltage on the input voltage bus; and
  the third switch is configured to be turned on when the voltage on the second switching node is equal to (1/M) of the voltage on the input voltage bus, and wherein M is greater than or equal to 2.

3. The apparatus of claim 2, further comprising:
an expansion unit connected between the first power switch and the first switching node, wherein the expansion unit comprises:
  an expansion power switch connected between the first power switch and the first switching node; and
  an expansion flying capacitor connected between a common node of the first power switch and the expansion power switch, and the common node of the second power switch and the fourth power switch, and wherein:
    the second switch is configured to be turned on when the voltage on the first switching node is equal to one third of the voltage on the input voltage bus; and
    the third switch is configured to be turned on when the voltage on the second switching node is equal to one third of the voltage on the input voltage bus.

4. The apparatus of claim 2, further comprising:
N expansion units connected in cascade between the first power switch and the first switching node, wherein each expansion unit comprises an expansion power switch and an expansion flying capacitor, and wherein:
  the second switch is configured to be turned on when the voltage on the first switching node is equal to (1/(N+2)) of the voltage on the input voltage bus; and
  the third switch is configured to be turned on when the voltage on the second switching node is equal to (1/(N+2)) of the voltage on the input voltage bus.

5. The apparatus of claim 1, wherein the hybrid switched capacitor converter is a dual-phase hybrid converter comprising:
  a second power switch and a third power switch connected in series between the second switching node and ground, and a first power switch having a first drain/source terminal connected to the input voltage bus and a second drain/source terminal coupled to the second switching node;
  a fifth power switch and a sixth power switch connected in series between the first switching node and ground, and a fourth power switch having a first drain/source terminal connected to the input voltage bus and a second drain/source terminal coupled to the first switching node;
  a first flying capacitor connected between the second switching node, and a common node of the fifth power switch and the sixth power switch;
  a second flying capacitor connected between the first switching node, and a common node of the second power switch and the third power switch;
  a first inductor connected between the common node of the second power switch and the third power switch, and an output voltage bus of the hybrid switched capacitor converter; and
  a second inductor connected between the common node of the fifth power switch and the sixth power switch, and the output voltage bus of the hybrid switched capacitor converter.

6. The apparatus of claim 5, further comprising:
an expansion unit connected to the first switching node and the second switching node, wherein the expansion unit comprises:
  a first expansion power switch connected between the first power switch and the second switching node;
  a second expansion power switch connected between the fourth power switch and the first switching node;
  a first expansion flying capacitor connected between a common node of the first power switch and the first expansion power switch, and the common node of the second power switch and the third power switch; and
  a second expansion flying capacitor connected between a common node of the fourth power switch and the second expansion power switch, and the common node of the fifth power switch and the sixth power switch, and wherein:
    the second switch is configured such that when the second switch is turned on, the voltage on the first switching node is equal to one third of the voltage on the input voltage bus; and
    the third switch is configured such that when the third switch is turned on, the voltage on the second switching node is equal to one third of the voltage on the input voltage bus.

7. The apparatus of claim 1, wherein the hybrid switched capacitor converter is a dual-phase hybrid converter comprising:
  a second power switch and a third power switch connected in series between a first internal node and ground, and a first power switch having a first drain/source terminal connected to the input voltage bus and a second drain/source terminal coupled to the first internal node;
  a fifth power switch and a sixth power switch connected in series between a second internal node and ground, and a fourth power switch having a first drain/source terminal connected to the input voltage bus and a second drain/source terminal coupled to the second internal node;
  a first flying capacitor connected between the first internal node, and a common node of the fifth power switch and the sixth power switch;
  a second flying capacitor connected between the second internal node, and a common node of the second power switch and the third power switch;
  a first inductor connected between the common node of the second power switch and the third power switch, and an output voltage bus of the hybrid switched capacitor converter;
  a second inductor connected between the common node of the fifth power switch and the sixth power switch, and the output voltage bus of the hybrid switched capacitor converter; and
  an expansion unit comprising:
    a first expansion power switch connected between the first power switch and the first internal node, wherein a common node of the first power switch and the first expansion power switch is the second switching node;
    a second expansion power switch connected between the fourth power switch and the second internal node, wherein a common node of the second expansion power switch and the fourth power switch is the first switching node;
a first expansion flying capacitor connected between a common node of the first power switch and the first expansion power switch, and the common node of the second power switch and the third power switch; and
a second expansion flying capacitor connected between a common node of the fourth power switch and the second expansion power switch, and the common node of the fifth power switch and the sixth power switch, and wherein:
the second switch is configured such that when the second switch is turned on, the voltage on the first switching node is equal to two thirds of the voltage on the input voltage bus; and
the third switch is configured such that when the third switch is turned on, the voltage on the second switching node is equal to two thirds of the voltage on the input voltage bus.

8. The apparatus of claim 1, wherein:
the first switch is a first MOSFET; and
the second switch and the third switch are two isolation switches comprising:
a second MOSFET connected between the first switching node and an internal node;
a third MOSFET connected between the second switching node and the internal node; and
a fourth MOSFET connected between the internal node and the input of the bias power regulator, and wherein:
the second MOSFET and the fourth MOSFET are back-to-back connected to each other to form a first isolation switch; and
the third MOSFET and the fourth MOSFET are back-to-back connected to each other to form a second isolation switch.

9. A method comprising:
in a startup process of a hybrid switched capacitor converter, configuring an input of a bias power regulator to be connected to an input voltage bus of the hybrid switched capacitor converter through a first switch; and
after the startup process of the hybrid switched capacitor converter finishes, configuring the input of the bias power regulator to be connected to a first switching node and/or a second switching node of the hybrid switched capacitor converter through a second switch and/or a third switch, respectively, wherein the second switch and the third switch are configured such that a voltage on the input of the bias power regulator is also equal to (L/M) of a voltage on the input voltage bus, and wherein L and M are positive integers, and M is greater than L.

10. The method of claim 9, wherein the hybrid switched capacitor converter comprises:
a flying capacitor and a third power switch connected in series between the first switching node and ground, and a first power switch having a first drain/source terminal connected to the input voltage bus and a second drain/source terminal coupled to the first switching node;
a second power switch and a fourth power switch connected in series between the first switching node and ground;
a first inductor connected between a common node of the flying capacitor and the third power switch, and an output voltage bus of the hybrid switched capacitor converter, and wherein the common node of the flying capacitor and the third power switch is the second switching node; and
a second inductor connected between a common node of the second power switch and the fourth power switch, and the output voltage bus of the hybrid switched capacitor converter.

11. The method of claim 10, further comprising:
after the startup process of the hybrid switched capacitor converter finishes, configuring the second switch to turn on and off in sync with the third power switch, and configuring the third switch to turn on and off complementary to the second switch, wherein the second switch and the third switch are configured such that the voltage on the input of the bias power regulator is equal to one half of the voltage on the input voltage bus.

12. The method of claim 10, wherein the hybrid switched capacitor converter further comprises an expansion unit connected between the first power switch and the first switching node, and wherein the expansion unit comprises:
an expansion power switch connected between the first power switch and the first switching node; and
an expansion flying capacitor connected between a common node of the first power switch and the expansion power switch, and the common node of the second power switch and the fourth power switch.

13. The method of claim 12, further comprising:
after the startup process of the hybrid switched capacitor converter finishes, configuring the second switch to turn on and off in sync with the third power switch, and configuring the third switch to turn on and off complementary to the second switch, wherein the second switch and the third switch are configured such that the voltage on the input of the bias power regulator is equal to one third of the voltage on the input voltage bus.

14. The method of claim 9, wherein the hybrid switched capacitor converter comprises:
a second power switch and a third power switch connected in series between the second switching node and ground, and a first power switch having a first drain/source terminal connected to the input voltage bus and a second drain/source terminal coupled to the second switching node;
a fifth power switch and a sixth power switch connected in series between the first switching node and ground, and a fourth power switch having a first drain/source terminal connected to the input voltage bus and a second drain/source terminal coupled to the first switching node;
a first flying capacitor connected between the second switching node, and a common node of the fifth power switch and the sixth power switch;
a second flying capacitor connected between the first switching node, and a common node of the second power switch and the third power switch;
a first inductor connected between the common node of the second power switch and the third power switch, and an output voltage bus of the hybrid switched capacitor converter; and
a second inductor connected between the common node of the fifth power switch and the sixth power switch, and the output voltage bus of the hybrid switched capacitor converter.

15. The method of claim 14, further comprising:
after the startup process of the hybrid switched capacitor converter finishes, configuring the second switch and the third switch to turn on and off alternately such that the voltage on the input of the bias power regulator is equal to one half of the voltage on the input voltage bus.

16. The method of claim 14, further comprising:

after the startup process of the hybrid switched capacitor converter finishes, configuring the second switch to turn on and off in sync with the third power switch, and configuring the third switch to turn on and off in sync with the sixth power switch, wherein the second switch and the third switch are configured such that the voltage on the input of the bias power regulator is equal to one half of the voltage on the input voltage bus.

17. The method of claim 14, wherein the hybrid switched capacitor converter further comprises:

an expansion unit connected to the first switching node and the second switching node, wherein the expansion unit comprises:
- a first expansion power switch connected between the first power switch and the second switching node;
- a second expansion power switch connected between the fourth power switch and the first switching node;
- a first expansion flying capacitor connected between a common node of the first power switch and the first expansion power switch, and the common node of the second power switch and the third power switch; and
- a second expansion flying capacitor connected between a common node of the fourth power switch and the second expansion power switch, and the common node of the fifth power switch and the sixth power switch.

18. The method of claim 16, further comprising:

after the startup process of the hybrid switched capacitor converter finishes, configuring the second switch to turn on and off in sync with the third power switch, and configuring the third switch to turn on and off in sync with the sixth power switch, wherein the second switch and the third switch are configured such that the voltage on the input of the bias power regulator is equal to one third of the voltage on the input voltage bus.

19. The method of claim 9, wherein the hybrid switched capacitor converter comprises:

a second power switch and a third power switch connected in series between a first internal node and ground, and a first power switch having a first drain/source terminal connected to the input voltage bus and a second drain/source terminal coupled to the first internal node;

a fifth power switch and a sixth power switch connected in series between a second internal node and ground, and a fourth power switch having a first drain/source terminal connected to the input voltage bus and a second drain/source terminal coupled to the second internal node;

a first flying capacitor connected between the first internal node, and a common node of the fifth power switch and the sixth power switch;

a second flying capacitor connected between the second internal node, and a common node of the second power switch and the third power switch;

a first inductor connected between the common node of the second power switch and the third power switch, and an output voltage bus of the hybrid switched capacitor converter;

a second inductor connected between the common node of the fifth power switch and the sixth power switch, and the output voltage bus of the hybrid switched capacitor converter; and an expansion unit comprising:
- a first expansion power switch connected between the first power switch and the first internal node, wherein a common node of the first power switch and the first expansion power switch is the second switching node;
- a second expansion power switch connected between the fourth power switch and the second internal node, wherein a common node of the second expansion power switch and the fourth power switch is the first switching node;
- a first expansion flying capacitor connected between a common node of the first power switch and the first expansion power switch, and the common node of the second power switch and the third power switch; and
- a second expansion flying capacitor connected between a common node of the fourth power switch and the second expansion power switch, and the common node of the fifth power switch and the sixth power switch.

20. The method of claim 19, further comprising:

after the startup process of the hybrid switched capacitor converter finishes, configuring the second switch to turn on and off in sync with the sixth power switch, and configuring the third switch to turn on and off in sync with the third power switch, wherein the second switch and the third switch are configured such that the voltage on the input of the bias power regulator is equal to two thirds of the voltage on the input voltage bus.

* * * * *